United States Patent
Wolf et al.

(10) Patent No.: US 10,057,748 B1
(45) Date of Patent: Aug. 21, 2018

(54) TECHNOLOGY APPLICATION RESTRUCTURING AND DEPLOYMENT FOR HOME RECEIVER INTEGRATION

(71) Applicant: BANK OF AMERICA CORPORATION, Charlotte, NC (US)

(72) Inventors: Jon Robert Wolf, Charlotte, NC (US); Charles R. Liu, San Francisco, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/723,614

(22) Filed: Oct. 3, 2017

(51) Int. Cl.
| | |
|---|---|
| H04W 92/00 | (2009.01) |
| H04W 4/02 | (2018.01) |
| H04B 5/00 | (2006.01) |
| H04W 4/80 | (2018.01) |
| H04W 4/00 | (2018.01) |
| G06F 9/44 | (2018.01) |

(Continued)

(52) U.S. Cl.
CPC ............ *H04W 4/80* (2018.02); *G06F 9/4443* (2013.01); *G06F 9/451* (2018.02); *G06F 13/102* (2013.01); *G06Q 20/3223* (2013.01); *H04W 4/008* (2013.01); *H04W 4/025* (2013.01); *H04W 8/005* (2013.01); *H04W 84/18* (2013.01); *H04W 88/02* (2013.01); *G06F 3/013* (2013.01); *H04W 92/00* (2013.01)

(58) Field of Classification Search
CPC ....... H04W 4/80; H04W 84/18; H04W 8/005; H04W 4/025; H04W 88/02; H04W 92/00; H04W 4/023; H04B 7/02; G06F 9/451; G06F 13/102; G06F 3/013; G06Q 20/3223
See application file for complete search history.

(56) References Cited

U.S. PATENT DOCUMENTS

| | | |
|---|---|---|
| 6,513,015 B2 | 1/2003 | Ogasawara |
| 6,845,361 B1 | 1/2005 | Dowling |

(Continued)

OTHER PUBLICATIONS

FIS Cardless Cash; Mobile Banking at the ATM; fisglobal.com (c)2017 FIS and/or its subsidiaries.

(Continued)

*Primary Examiner* — Andrew Wendell
(74) *Attorney, Agent, or Firm* — Michael A. Springs; Moore & Van Allen PLLC; Nicholas C. Russell

(57) ABSTRACT

Embodiments of the present invention relate to, in general, for technology application restructuring and deployment for home receiver integration. The system is configured to provide a technology application on a home receiver, such as a functionally tethered smart device, to facilitate performing user activities. Typically, the system is configures the user mobile device as a remote control for allowing the user to perform technology activities using the tethered smart device technology application, via the user mobile device. In some embodiments, the system is configured to initiate presentation of a tethered smart device activity interface on a display device of the tethered smart device. In some embodiments, the system is configured to present an auxiliary mobile interface on a display of the user mobile device, wherein the auxiliary mobile interface comprises the predetermined graphical element of the tethered smart device activity interface, for completion of a technology activity.

20 Claims, 8 Drawing Sheets

(51) Int. Cl.
*H04W 88/02* (2009.01)
*H04W 84/18* (2009.01)
*G06F 13/10* (2006.01)
*G06Q 20/32* (2012.01)
*H04W 8/00* (2009.01)
*G06F 9/451* (2018.01)
*G06F 3/01* (2006.01)

(56) References Cited

U.S. PATENT DOCUMENTS

| | | |
|---|---|---|
| 7,047,560 B2 | 5/2006 | Fishman et al. |
| 8,332,232 B2 | 12/2012 | Nickerson et al. |
| 8,548,912 B2 | 10/2013 | Cincera |
| 8,972,297 B2 | 3/2015 | Kay et al. |
| 9,076,135 B2 | 7/2015 | Dent et al. |
| 9,311,632 B1 | 4/2016 | Dent |
| 9,380,421 B1 | 6/2016 | Vltavsky |
| 9,432,804 B2 | 8/2016 | Hanson et al. |
| 9,525,694 B2 | 12/2016 | Pender |
| 9,589,256 B1 | 3/2017 | Thomas et al. |
| 2004/0133477 A1 | 7/2004 | Morris et al. |
| 2004/0133516 A1 | 7/2004 | Buchanan et al. |
| 2005/0087594 A1 | 4/2005 | Phillips et al. |
| 2008/0114697 A1 | 5/2008 | Black et al. |
| 2009/0037339 A1 | 2/2009 | Ancell et al. |
| 2010/0332400 A1 | 12/2010 | Etchegoyen |
| 2011/0246316 A1 | 10/2011 | Cincera |
| 2011/0251892 A1 | 10/2011 | Laracey |
| 2012/0158297 A1 | 6/2012 | Kim et al. |
| 2012/0160912 A1 | 6/2012 | Laracey |
| 2012/0185386 A1 | 7/2012 | Salama et al. |
| 2012/0265809 A1 | 10/2012 | Hanson et al. |
| 2013/0297422 A1 | 11/2013 | Hunter et al. |
| 2014/0122333 A1 | 5/2014 | Whipple et al. |
| 2014/0380193 A1* | 12/2014 | Coplen ............. G06F 3/04847 715/753 |
| 2015/0230004 A1* | 8/2015 | VanDuyn ........... H04N 21/6334 725/27 |
| 2017/0034581 A1* | 2/2017 | Short ................. H04N 21/4126 |
| 2017/0064498 A1* | 3/2017 | Manges ................ H04W 4/02 |
| 2017/0091810 A1* | 3/2017 | McGovern ........ G06Q 30/0246 |
| 2017/0300287 A1* | 10/2017 | Yan ..................... G06F 3/1454 |

OTHER PUBLICATIONS

Mary Wisniewski—Published Jan. 13, 2015; Getting Cash? Phone it in: Wintrust Embraces the 'Cardless ATM'; American Banker—More in Bank technology, Digital banking, ATMs.

* cited by examiner

US 10,057,748 B1

TECHNOLOGY APPLICATION RESTRUCTURING AND DEPLOYMENT FOR HOME RECEIVER INTEGRATION

BACKGROUND

Smartphones are commonly used by individuals to perform a variety of activities. However, despite the proliferation of user mobile devices, user mobile devices operate disparate from tethered smart devices and other home receivers. Moreover, user mobile devices are typically not configured allow a user to perform various network activities, seamlessly and with ease, across various channels. In addition, home receivers are typically not configured for performing activities outside a predetermined scope. A needs exists for systems and methods for seamless integration of home receiver devices and for improving the functionality and connectivity of user mobile devices for performing activities.

The present invention addresses the foregoing needs and also provides improvement to technology by enhancing the functionality of a user mobile devices and tethered smart devices for home receiver integration. Moreover, the present invention configures the user mobile device a central control for seamless multi-channel operative communication across a plurality of networked devices for performing technology activities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the invention relate to systems, computer-implemented methods, and computer program products (e.g., computer readable program code, and/or non-transitory tangible computer readable media for technology application restructuring and deployment for home receiver integration, wherein the system is configured to provide a technology application on a functionally tethered smart device to facilitate performing user activities. Typically, in various embodiments of the invention, the systems, methods, and computer program products are configured to: receive, via a first operative communication channel of the communication network, a trigger signal from a user mobile device associated with a user, wherein the trigger signal comprises activity data associated with a first technology activity initiated by the user; establish a second operative communication channel, via the communication network, with a tethered smart device associated with a user; transmit, via the second operative communication channel, a tethered smart device technology application to the tethered smart device; initiate presentation of a tethered smart device activity interface of the tethered smart device technology application on a display device of the tethered smart device; identify a first technology interface portion of the tethered smart device activity interface that is associated with performing the first technology activity, wherein the first technology interface portion comprises one or more graphical elements associated with the first technology activity; in response to at least determining that (i) a spatial distance between the tethered smart device and the user is greater than a first predetermined distance and (ii) the first technology interface portion comprises a predetermined graphical element of the one or more graphical elements associated with the first technology activity, present an auxiliary mobile interface on a display of the user mobile device, wherein the auxiliary mobile interface comprises the predetermined graphical element of the first technology interface portion; receive, via the auxiliary mobile interface of the user mobile device, a user input associated with the first technology activity; modify, dynamically, the tethered smart device activity interface presented on the display device of the tethered smart device based on the user input received via the auxiliary mobile interface of the user mobile device, wherein modifying the tethered smart device activity interface comprises modifying the one or more graphical elements; initiate presentation of an activity completion confirmation via a tethered smart device activity interface of the tethered smart device technology application in response to completion of the user activity based on the user input.

In some embodiment, or in combination with any of the previous embodiments, initiating presentation of the tethered smart device activity interface of the tethered smart device technology application further comprises: determining that a geographical location of the tethered smart device is the same as a geographical location of the user mobile device such that the tethered smart device is located within a predetermined near field communication range of the user mobile device; transmitting a trigger activation signal to the user mobile device, wherein the trigger activation signal is structured to cause an offline tethered smart device to connect to the communication network, wherein the trigger activation signal is configured to cause the user mobile device to: establish a near field operative communication channel, via the communication network, with the tethered smart device; transmit, via the near field communication channel, the trigger activation signal to the tethered smart device, wherein the trigger activation signal is configured to cause an offline tethered smart device to connect to the communication network; and transmit, via the near field communication channel, an interface control signal structured to cause the tethered smart device to present the tethered smart device activity interface of the tethered smart device technology application on the display device of the tethered smart device.

In some embodiment, or in combination with any of the previous embodiments, initiating presentation of the tethered smart device activity interface of the tethered smart device technology application further comprises: determining that a geographical location of the tethered smart device is the same as a geographical location of the user mobile device; and transmitting an interface control signal to cause the tethered smart device to overlay the tethered smart device activity interface of the tethered smart device technology application on an existing display device interface of the tethered smart device, wherein overlaying the tethered smart device activity interface comprises disabling the existing display device interface such that only the tethered smart device activity interface is active; wherein the user mobile device is configured as a remote control for allowing the user to perform the first technology activity using the tethered smart device technology application, via the user mobile device.

In some embodiment, or in combination with any of the previous embodiments, initiating presentation of the tethered smart device activity interface of the tethered smart device technology application further comprises: identifying application parameters of the tethered smart device, wherein the application parameters of the tethered smart device comprise operating system parameters and display device parameters of the tethered smart device; configuring the tethered smart device technology application such that at least the tethered smart device activity interface of the tethered smart device technology application matches the application parameters of the tethered smart device, comprising: configuring the tethered smart device activity interface such that an application resolution of the tethered smart device activity interface matches a resolution of the display device parameters of the tethered smart device; and modifying display sizes and display positions of the one or more graphical elements such that tethered smart device activity interface is presented on the display device of the tethered smart device without requiring scrolling, wherein modifying display sizes of the one or more graphical elements comprises converting predetermined textual content of the one or more graphical elements into a pop-up interface and inserting a link element to the pop-up interface in the tethered smart device activity interface.

In some embodiment, or in combination with any of the previous embodiments, the tethered smart device is a smart television device that is functionally tethered to an external power source comprising an energized electrical circuit.

In some embodiment, or in combination with any of the previous embodiments, the tethered smart device is a smart speaker device having the display device, wherein the smart speaker device is functionally tethered to an external power source comprising an energized electrical circuit.

In some embodiment, or in combination with any of the previous embodiments, the user mobile device is a smart phone device.

In some embodiment, or in combination with any of the previous embodiments, initiating presentation of the tethered smart device activity interface of the tethered smart device technology application further comprises further comprises: accessing a user mobile device security identifier stored in the user mobile device; accessing a tethered smart device security identifier stored in the tethered smart device; validating user authentication credentials received at the user mobile device from the user; authenticating the first technology activity, based on at least successful validation of (i) the user authentication credentials, (ii) the user mobile device security identifier, and (iii) the tethered smart device security identifier; allowing the user to perform the first technology activity using the tethered smart device technology application, via the user mobile device in response to successful authentication of the first technology activity.

In some embodiment, or in combination with any of the previous embodiments, the predetermined graphical element of the one or more graphical elements associated with the first technology activity comprises at least one of (i) an input type component structured to facilitate receiving an user input associated with the first technology activity upon activation, and (ii) a security type component structured to output predetermined secure information associated with the first technology activity to the user.

In some embodiment, or in combination with any of the previous embodiments, identifying the first technology interface portion of the tethered smart device activity interface that is associated with performing the first technology activity comprises determining, in real time, that the first technology interface portion comprises at least a portion of graphical elements required for performing at least a subsequent step of the first technology activity.

In some embodiment, or in combination with any of the previous embodiments, identifying the first technology interface portion of the tethered smart device activity interface that is associated with performing the first technology activity comprises: tracking, via an optical sensor device of the tethered smart device, an area of gaze of the user's eyes when the user is viewing the tethered smart device activity interface presented on the display device of the tethered smart device, wherein tracking the area of gaze further comprises: transmitting a sensing trigger signal that is structured to cause the optical sensor device to transmit a light signal comprising infrared and/or near-infrared light; and transmitting a recipient trigger signal that is structured to cause the optical sensor device to receive the reflected light signal reflected from the user's eyes; determining the area of gaze of the user's eyes based on analyzing the reflected light signal, wherein computing the area of gaze comprises computing, continuously and in real-time, a point of regard of the user's gaze on the surface of the display device of the tethered smart device based on at least determining a gaze direction of the user's eyes; identifying the first technology interface portion of the tethered smart device activity interface based on determining that (i) the first technology interface portion matches the area of gaze of the user's eyes, and (ii) the user viewed the area of gaze for at least a predetermined viewing time period.

In some embodiment, or in combination with any of the previous embodiments, identifying the first technology interface portion of the tethered smart device activity interface that is associated with performing the first technology activity comprises: determining, via an optical sensor device of the tethered smart device, a predetermined gesture performed by the user; and identifying the first technology interface portion of the tethered smart device activity interface based on correlating a three-dimensional special movement of the predetermined gesture performed by the user with a corresponding area of the display device of the tethered smart device.

In some embodiment, or in combination with any of the previous embodiments, initiating the presentation of a tethered smart device activity interface of the tethered smart device technology application further comprises: establishing, via the communication network, a wireless communication channel between the tethered smart device and an entity system associated with a specialist associated with performing first technology activity; establishing an audio-video conference, via a conference application of the tethered smart device, between the user and the specialist, wherein establishing the audio-video conference further comprises presenting a real-time video feed received from the specialist system via the tethered smart device activity interface on the display device of the tethered smart device.

In some embodiment, or in combination with any of the previous embodiments, establishing the audio-video conference further comprises: activating a microphone device of the user mobile device for use with the presented auxiliary mobile interface on a display of the user mobile device; receiving the user input comprising an audio input at the auxiliary mobile interface via the microphone device of the user mobile device; and transmitting, the received audio input to the entity system for conducting the audio-video conference between the user and the specialist.

In some embodiment, or in combination with any of the previous embodiments, establishing the audio-video conference further comprises: activating a speaker device of the user mobile device for use with the presented auxiliary mobile interface on a display of the user mobile device;

receiving an audio signal from the entity system comprising a real-time audio feed of the specialist; and presenting the received audio signal at the auxiliary mobile interface via the speaker device of the user mobile device for conducting the audio-video conference between the user and the specialist.

In some embodiment, or in combination with any of the previous embodiments, determining that the spatial distance between the tethered smart device and the user is greater than the first predetermined distance is based on at least one of (i) determining, via received location signals from a positioning device of the user mobile device, that the spatial distance between the tethered smart device and the user is greater than the first predetermined distance, and (ii) identifying, via an image capture device of the tethered smart device, that the spatial distance between the tethered smart device and the user is greater than the first predetermined distance.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
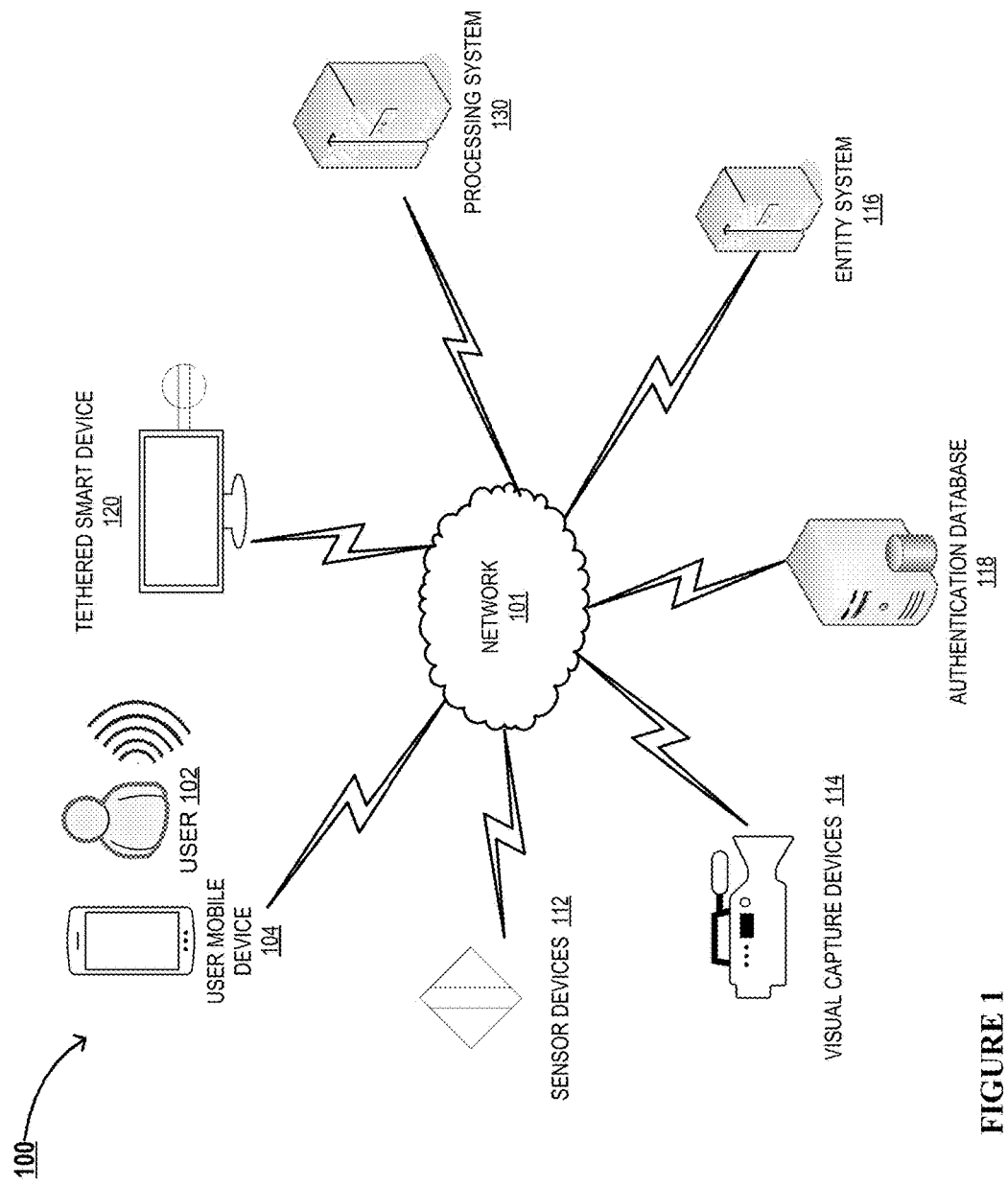
FIG. 1 illustrates a block network architecture diagram illustrating a system environment 100 for technology application restructuring and deployment for home receiver integration, in accordance with some embodiments of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more users (for examples, the users are customers of the entity). In some embodiments, the entity owns, operates or facilitates services associated with tethered smart devices such as smart information walls, smart television devices and the like.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer.

In some instances described herein, the user is an individual who seeks to utilize, operate, or perform one or more activities associated with a tethered smart device (e.g., using a user mobile device such as a smart phone as a central control), typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and tethered smart devices described herein. In other embodiments, a user may be a system or an entity performing one or more tasks described herein.

The term "tethered smart device" or "home receiver" as used herein may refer to one or more electronic devices or appliances that are functionally tethered to an external power source comprising an energized electrical circuit (e.g., AC power circuit), for example, by means of a wall socket/plug wired connection. Typically, the tethered smart device is powered by a wire connection to an external Alternating Current (AC) power supply, and ceases to be powered and ceases to function when unplugged from the external AC current supply. Typically, the tethered smart device is not easily portable. In some embodiments, the tethered smart device refers to a smart television device, capable of running one or more technology applications via an operating system. In some embodiments, the tethered smart device refers to a smart speaker device, capable of running one or more technology applications via an operating system and/or a personal digital assistant. The present invention typically configures the tethers smart device to perform one or more technology activities. Moreover, the system is configures the tethered smart device and/or the user mobile device to operatively communicate with each other via a network. Typically, a tethered smart device is configured to facilitate performance of one or more user activities by establishing an "interactive session" between a user and the tethered smart device, and more specifically between the user's user mobile device and the tethered smart device (e.g., via a secure wireless communication channel such as a near-field communication channel). As such, the terms "technology activity", "user activity", "network activity" or "user transaction" or simply "activity" may refer to financial or non-financial activities, tasks, events or actions. In some embodiments a tethered smart device refers to one or more devices that facilitate execution of financial transactions or activities. In this regard, the tethered smart devices may be Automated Teller Machines (ATMs), Point of sale (POS) devices, vending machines, checkout registers, ticket vending machines, automated retail transaction devices, banking terminals in a financial institution, financial institution servers, merchant servers, other computing devices that involve financial user activities or transactions in one form or another, or may comprise technology elements and/or functionality of one or more aforementioned devices, or a suitable combination of the aforementioned devices/apparatuses. In some embodiments the tethered smart device refers to devices that facilitate execution of non-financial user activities or transactions, for example, smart devices (e.g., secure doors with authentication features, smart learning walls, smart televisions, tablets, smart automobiles, and the like), check-in terminals for various industries, for example: hospitality, travel, healthcare and the like, information kiosks and other tethered smart devices that do not involve a user performing a financial transaction via the tethered smart device. In some embodiments the tethered smart devices enable execution of both financial and non-financial transactions/activities (e.g., a tethered smart device may be a suitable combination of any of the aforementioned tethered smart devices with respect to their features, design and/or function). In some embodiments, the tethered smart devices may be owned, operated and/or otherwise associated with the user or other entities, and are installed at suitable locations (e.g., user's home, financial institution location, etc.). In some embodiments, the tethered smart devices may be owned, operated and/or otherwise associated with the user. In embodiments described herein, performing a user activity or transaction may refer to the initiation, stages during the processing, or completion of a transaction. The tethered smart device of the present invention is interactive and is configured to communicate with a user using visual, audio or other means, either directly (e.g., using display devices of the tethered smart device) or via suitable devices (e.g., via a user mobile device).

Typically, the user may provide authentication credentials for conducting user activities or transactions at the tethered smart device and/or at the user mobile device. In some embodiments, tethered smart device and/or the user mobile device require the user to perform one or more authentication steps based on the level of authorization desired for a particular user activity or transaction. In this regard, for example, the user may provide one or more account numbers, user identifiers or userID and the like and further may provide the accompanying personal identification numbers (PIN), passwords, CVV numbers and the like associated with the individual tethered smart device, individual mobile device, and/or the individual card/account provided for authentication.

A "technology activity", "user activity", a "network activity", a "resource transfer" or "resource distribution" or a transaction refers to any communication between a user and the financial institution or other entity monitoring the user's activities to transfer funds for the purchasing or selling of a product, financial activities or non-financial activities of a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or user mobile device (e.g. a mobile cellular device, smartphone), a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Referring to FIG. 1, a block diagram illustrating a system environment 100 configured for technology application restructuring and deployment for home receiver integration, is illustrated, in accordance with some embodiments of the invention. As illustrated, the system environment 100 may comprise a tethered smart device 120, in operative communication with a user mobile device(s) 104 associated with a user 102, a processing system 130, one or more sensor devices 112, one or more visual capture devices 114, an authentication database 118, an entity system 116 and/or other systems/devices not illustrated herein, via a network 101. As such, the tethered smart device 120 is configured such that the user 102 may perform one or more user activities or transactions by utilizing the tethered smart device directly (for example, by physically operating the tethered smart device 120 and its interfaces, using input/output devices of the tethered smart device 120, using audio commands, using physical gestures, and the like) and/or via communication between the user mobile device 104 and the tethered smart device 120 (for example, by establishing operative communication channels between the user mobile device 104 and the tethered smart device 120 via a wireless network and interacting with the tethered smart device 120 via the devices and interfaces of the user mobile device 104).

Typically, the processing system 130 and the authentication database 118 are in electronic communication with the tethered smart device 120 and the user mobile device 104, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user mobile device 104 and the tethered smart device 120). In this regard, the wireless communication channel may further comprise near field communication (NFC), communication via radio waves, communication through the internet, communication via electromagnetic waves and the like.

As discussed previously, the tethered smart device 120 is configured to facilitate performance of user activities, and is configured to provide real-time interactive sessions for the user 102. In some embodiments, the tethered smart device 120 is a smart television device configured for uniquely facilitating user activities in accordance with some embodiments, while ensuring the security and privacy of the user. The components of the tethered smart device 120, its features and functions will be described in detail through this disclosure and with respect to FIG. 2, in particular.

In some embodiments, the tethered smart device 120 receives signals, images and other data captured by the sensor devices 112 and/or the visual capture devices 114, during its execution of user activities. In this regard, in some embodiments, the tethered smart device 120 communicates with, transmits instructions, and/or receives signals from the sensor devices 112 and the visual capture devices 114 directly, via the network 101, typically, in real-time. In some embodiments, the tethered smart device 120 communicates with the sensor devices 112 and the visual capture devices 114 through the processing system 130, typically, in real-time. Alternatively, the sensor devices 112 and/or the visual capture devices 114 maybe in-built within the tethered smart device 120. Analyzing the signals received from the sensor devices 112 and the visual capture devices 114 typically enables the tethered smart device 120, the processing system 130, or the devices 112 and 114 themselves, to determine user location, determine trigger events (e.g., user approach to or spatial distance from the tethered smart device 120, user physical gestures, user eye-tracking or gaze determination, retrieve/identify user authentication credentials from the user and/or the user mobile device, establishing communication with the user mobile device in the vicinity of the tethered smart device 120, determination of whether the user mobile device comprises an integrated resource transfer application, and the like), capture one or more parameters associated with the environment or physical location of the tethered smart device 120, and the like.

In some embodiments, the sensor devices 112 are position sensors configured to sense or determine the position and/or location of the user 102, location of the user mobile device 104, location of other individuals, objects/devices, or entities. As such, the sensor devices 112 may determine an absolute position (for example, location/positioning coordinates) or a relative position (for example, with respect to the position of the tethered smart device 120, with respect to position of the user or another individual, with respect to the position of the user mobile device 104, with respect to the sensor 112 itself or a predetermined object and the like) of the user, individual or object. Here, in some embodiments, the sensor devices 112 are proximity sensors that are configured to determine the presence of the user or object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the tethered smart device 120, the user mobile device 104, and/or the processing system 130, to determine the location of the user/object and/or track movement of the user/object. Here, the sensor 112 may be configured to perform modulation, demodulation, amplification and output switching of the proximity and return signals.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users or objects varies the current flowing through the loop which facilitates determination of presence of users or objects. In some embodiments, the sensor devices 112 comprise sensor devices provided in the user mobile device 104, such as, biometric sensors (for example, fingerprint scanner of a mobile phone, heart rate or temperature monitor of a wearable user mobile device, and the like), location sensors (for example, GPS devices, accelerometers, and the like), visual capture devices/cameras, facial recognition devices, devices for capturing user gestures (for example, a touch screen) and other sensing devices of the user mobile device 104. Here, the tethered smart device 120 and/or the processing system 130 may transmit control signals to the user mobile device to cause the sensing devices of the user mobile device 104 to capture one or more parameters and/or to transmit one or more captured parameters.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the tethered smart device 120, the processing system 130 and/or the capture devices 114, to determine the presence and position of the user, other individuals or objects, their movement in the proximity area, hands-free gestured performed by the user, and the like. Although described separately, it is understood that the visual capture devices 114 may be associated with the sensor devices 112. As such, sensors or sensor devices, as alluded to herein, may refer to the various sensor devices described herein and the visual/image capture devices described herein.

As alluded to previously, the processing system 130 is in operative communication with the tethered smart device 120. In some embodiments, processing system 130 is configured to transmit control instructions that are configured to cause the tethered smart device 120, the user mobile device 104, the sensor device 112 and/or the visual capture devices 114 to perform at least a portion of the steps associated with one or more activities. The processing system 130 may be associated with the same entity as the tethered smart device 120, the tethered smart device technology application, or may be associated with another entity. The structure and components of the processing system 130 is described in detail with respect to FIG. 3. The tethered smart device 120 may further communicate with the entity system 116 and/or the authentication database 118, either directly or via the processing system 130. The authentication database 118 may comprise authentication credentials associated with the user. The processing system 130 and/or the tethered smart device 120 may retrieve the authentication credentials from the authentication database to authenticate the user prior to executing one or more user activities or transactions.

The user mobile device 104 may comprise a mobile communication device, such as a smartphone (i.e., cellular telecommunications device), a computing device such as a laptop computer, a personal digital assistant (PDA), a mobile internet accessing device, or other user mobile device including, but not limited to portable digital assistants (PDAs), pagers, mobile televisions, gaming devices, laptop computers, cameras, video recorders, audio/video player, radio, GPS devices, any combination of the aforementioned, or the like. In some embodiments, the user mobile device 104 refers to a smartphone associated with the user. As discussed previously, in some embodiments, the tethered smart device 120 of the present invention is configured to establish operative communication channels with the user mobile device 104, and vice versa, such that, the user 102 may perform one or more user activities, either entirely or in part, at the tethered smart device 120 by interacting with the user mobile device 104. The user mobile device 104 is described in detail with respect to FIG. 4.

Figure 2:
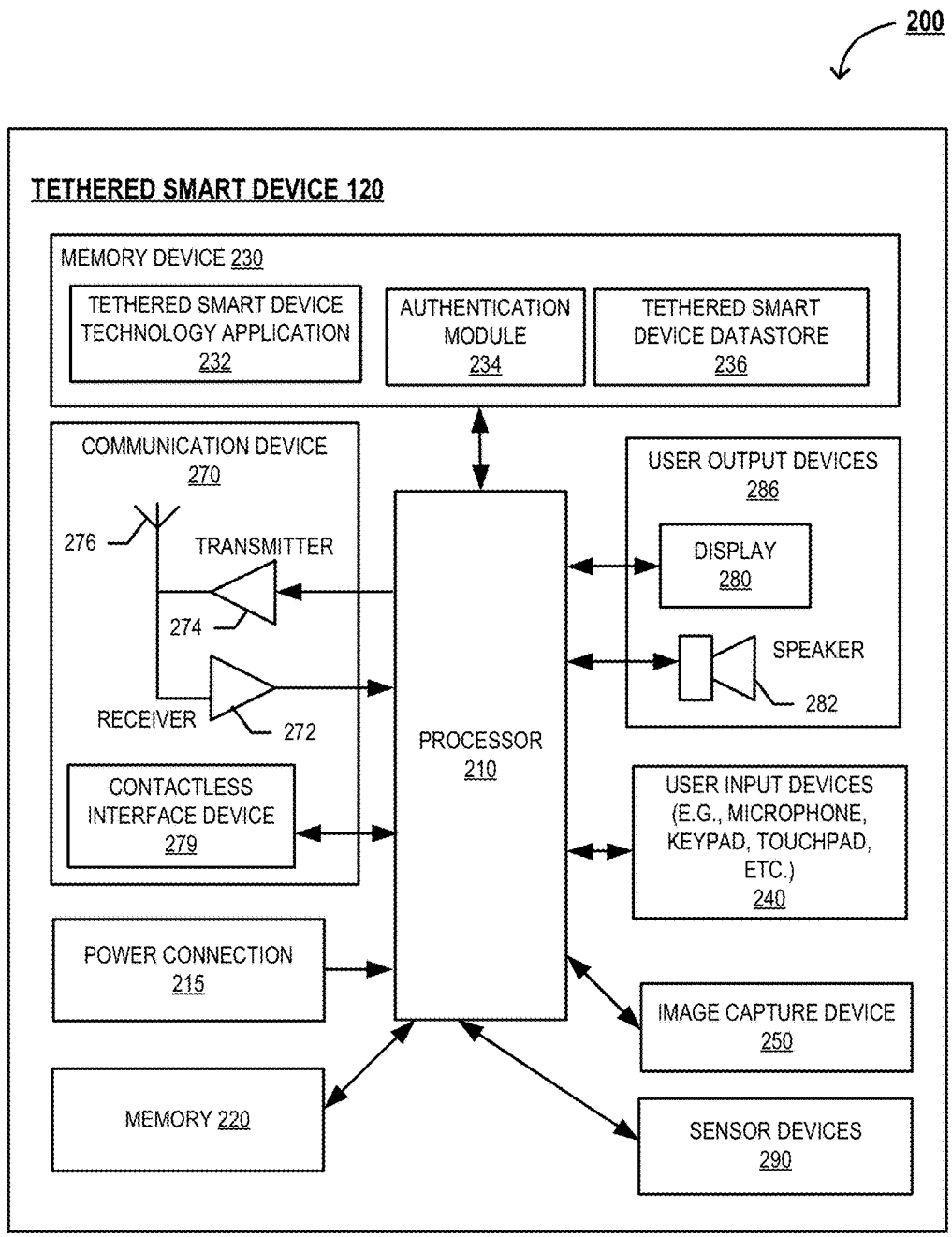
FIG. 2 illustrates a block diagram 200 of a tethered smart device 120, in accordance with some embodiments of the invention.

FIG. 2, illustrates a block diagram 200 of the tethered smart device 120, such as a smart television device, in accordance with some embodiments of the invention. As discussed previously, the tethered smart device 120 is configured to facilitate performance of user activities, and is configured to provide or facilitate real-time interactive sessions for the user 102, either on the user mobile device of the user or on the tethered smart device 120 itself, using one or more communication channels established via the network 101. The tethered smart device 120 typically includes a processing device or a processor 210, memory device 230, storage memory 220 or datastore 220, and a communication device 270. As discussed previously, the term "tethered smart device" or "home receiver" as used herein may refer to one or more electronic devices or appliances that are functionally tethered to an external power source comprising an energized electrical circuit (e.g., AC power circuit), for example, by means of a wall socket/plug wired connection. Typically, the tethered smart device is powered by a wire connection to an external Alternating Current (AC) power supply, and ceases to be powered and ceases to function when unplugged from the external AC current supply. Typically, the tethered smart device is not easily portable. In some embodiments, the tethered smart device refers to a smart television device, capable of running one or more technology applications via an operating system. In some embodiments, the tethered smart device refers to a smart speaker device, capable of running one or more technology applications via an operating system and/or a personal digital assistant.

As such, the tethered smart device 120, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user mobile device 104, sensor devices 112, visual capture devices 114, the user 102, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of one or more tethered smart device activity interfaces.

As discussed previously, "tethered smart device" as used herein may refer to one or more electronic devices that facilitate one or more user activities or transactions. Typically, a tethered smart device is configured to facilitate performance of one or more user activities by establishing an "interactive session" between a user and the tethered smart device, and more specifically between the user's user mobile device and the tethered smart device (e.g., via a secure wireless communication channel) when configured in accordance with the present invention. In some embodiments the tethered smart device refers to devices that facilitate execution of non-financial user activities or transactions, for example, smart devices such as, secure doors with authentication features, smart learning walls, smart televisions, smart speaker devices, and the like, and other devices that involve user activities or transactions in one form or another, or may comprise technology elements and/or functionality of one or more aforementioned devices, or a suitable combination of the aforementioned devices/apparatuses. In some embodiments the tethered smart devices enable execution of both financial and non-financial transactions/activities (e.g., a tethered smart device may be a suitable combination of any of the aforementioned tethered smart device 120 devices with respect to their features, design and/or function).

The processing device 210 may generally refer to a device or combination of devices having circuitry used for implementing the communication and/or logic functions of the tethered smart device 120. For example, the processing device 210 may include a control unit, a digital signal processor device, a microprocessor device, and various analog-to-digital converters, digital-to-analog converters, and other support circuits and/or combinations of the foregoing. Control and signal processing functions of the tethered smart device 120 may be allocated between these processing devices according to their respective capabilities.

The tethered smart device 120 may further include various components/devices in operative communication with and/or controlled by the processor 210, such as user output devices 286, user input devices 240, a network communication interface 279 (such as a contactless interface 279), a wired power connection 215 to an external energized electrical circuit (e.g., AC power supply), and the like. Furthermore, in some embodiments, the processor 210 is operatively coupled to and is configured to control other components/devices of the tethered smart device 120, such as an image capture device 250 (e.g., built-in image capture devices 114 described previously), sensor devices 290 (e.g., built-in sensor devices 112 described previously), and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a tethered smart device technology application 232 (also referred to as a tethered smart device application), an authentication module 234, a tethered smart device datastore 236 stored therein. In some embodiments, the authentication module 234 is integral with the tethered smart device technology application 232. In some embodiments, the tethered smart device technology applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the tethered smart device technology application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the tethered smart device 120 and other devices/systems in the network 101 to cause them to perform the steps. Generally, the tethered smart device technology application 232 is executable to receive technology activity instructions/trigger signals from the user (typically via the user mobile device) and perform user activities and the various steps described herein. In some embodiments, the tethered smart device technology application 232 comprises a personal digital assistant for interfacing with the user at the tethered smart device 120. The tethered smart device technology application 232 may be coupled to a tethered smart device technology application datastore 236 for storing application data as the user activity is being performed. The tethered smart device technology application datastore 236 may store the application data temporarily for the predetermined duration of the execution of the activity (such as a memory buffer, or cache memory), or permanently.

The tethered smart device 120 may require users to identify and/or authenticate themselves before the tethered smart device 120 may initiate, perform, complete, and/or facilitate a user activity. For example, in some embodiments, the tethered smart device 120 is configured (and/or the tethered smart device technology application 232 is executable) to authenticate a tethered smart device user based at least partially on a username, password, PIN, biometric information, and/or one or more other credentials (e.g., captured at the user mobile device 104) that the user presents to the tethered smart device 120 via the user mobile device 104. Additionally or alternatively, in some embodiments, the tethered smart device 120 is configured to authenticate a user by using one-, two-, or multi-factor authentication. For example, in some embodiments, the tethered smart device 120 requires two-factor authentication, such that the user must provide a valid debit card and enter the correct PIN associated with the debit card at the user mobile device 104 in order to authenticate the user to the tethered smart device 120. However, either alternatively or in addition to the aforementioned authentication features, the tethered smart device 120 may require biometric authentication of the user 102 at the user mobile device 104 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 and/or via the auxiliary interface presented on the user mobile device (for example, based on determining the desired authorization level for the user activity), activating pertinent sensors and devices for receipt of the credentials (sensor devices (290, 440)/image capture devices (250, 450) for biometric credentials, contact less interface device 279 for receiving authentication tokens from a user mobile device via NFC channels, and the like), receiving authentication credentials, validating the credentials (for example based on retrieving user credentials from the datastore 236, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the tethered smart device 120, between the tethered smart device 120, particularly the processing device 210, and other devices or systems, such as the processing system 130, the user mobile device 104, the authentication database 118, the entity system 116, and the like. In this regard, the communication interface 270 comprises a transmitter 274, a receiver 272, a broadcasting device 276 to transmit and receive signals from corresponding devices via a suitable transmission medium or a communication channel. In some embodiments, the tethered smart device 120 is configured to be coupled/connected to other devices and systems via wired communication channels. In other embodiments, the tethered smart device 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user mobile device 104. Here, the tethered smart device 120 may include a transceiver, i.e., one or more antennas and and/or other electronic circuitry, devices, and software, for receiving data when a device is held close to or tapped at a suitable location of the tethered smart device 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the tethered smart device 120 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network 101. In this regard, the tethered smart device 120 may be configured to operate with one or more air interface standards, communication protocols, modulation types, and access types. By way of illustration, the tethered smart device 120 may be configured to operate in accordance with any of a number of first, second, third, and/or fourth-generation communication protocols and/or the like. For example, the tethered smart device 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The tethered smart device 120 may also be configured to operate in accordance with non-cellular communication mechanisms, such as via a wireless local area network (WLAN) or other communication/data networks.

The user interface of the tethered smart device 120 may include user input devices 240 and user output devices 286, as illustrated by FIG. 2. The user interface of the tethered smart device 120 is typically configured to facilitate the interactive sessions with the user. The user output devices 286 typically include a display device 280 (e.g., a liquid crystal display, a touchscreen display, and/or the like) which is operatively coupled to the processing device 210. In some embodiments, where the tethered smart device 120 requests the user's signature (if needed), the system may cause the user mobile device's touch screen to request, receive and transmit the user's signature. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the tethered smart device 120 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the tethered smart device 120.

As illustrated by FIG. 2, the tethered smart device may further comprise an image capture device 250. The image capture device 250 typically comprises cameras and other audio, video and image capture devices. The image capture device 250 is configured to capture images and/or video streams, typically in real-time, of a predetermined proximity area in the vicinity of the tethered smart device 120 location. The images and/or video streams may be analyzed by the tethered smart device 120 to determine the presence and position of the user, other individuals or objects and their movement in the proximity area, to identify the user for authentication or facial recognition purposes, and the like. In some embodiments, the system is configured to present a customized interface for the user based on identifying the user using facial recognition.

In some embodiments, the tethered smart device further comprises sensor devices 290. In some embodiments, the processor 210 communicates with, transmits instructions, and/or receives signals from the sensor devices 290, in real-time for detecting the presence of the users or other individuals, determining user location, determining user eye gaze, identifying user gestures, capturing authentication credentials for the user, determining parameters associated with the user, determining trigger events, capturing one or more parameters associated with the environment or physical location of the tethered smart device 120, and the like. These sensor devices 112 may be contact type sensors that determine the presence of the user or object based on contact, or non-contact type sensors that detect distant users or objects. In some embodiments, the sensor devices 290 of the tethered smart device are similar to the sensor devices 112 described previously, for determining the absolute or relative position, location, and proximity of the user, other individuals, or predetermined objects, within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some embodiments, the tethered smart device comprises optical sensor devices 290 for tracking an area of gaze of the user's eyes when the user is viewing the tethered smart device activity interface presented on the display device of the tethered smart device. Typically, the system 130 is configured to transmitting a sensing trigger signal to the tethered smart device that is structured to cause the optical sensor device 290 to transmit a light signal comprising infrared and/or near-infrared light. This light signal that is incident on the user's eyes, is reflected by the cornea, lens of the eye, retinal bold vessels, and/or the pupils of the user's eyes. The optical sensor device then receives the reflected light signal reflected from the user's eyes. The processing system 130 and/or the tethered smart device 120 may then determine the area of gaze of the user's eyes based on analyzing the reflected light signal. Here, the processing system 130 and/or the tethered smart device 120 may compute, continuously and in real-time, a point of regard of the user's gaze on the surface of the display device of the tethered smart device based on at least determining a gaze direction of the user's eyes. The processing system 130 and/or the tethered smart device 120 may the correlate the computed area of gaze with the first technology interface portion currently being displayed by the tethered smart device in that area of gaze.

In some embodiments, the tethered smart device comprises optical sensor devices 290 for determining spatial or three dimensional gestures performed by the user. The processing system 130 and/or the tethered smart device 120 may the correlate the three-dimensional special movement of the predetermined gesture performed by the user with the first technology interface portion currently being displayed by the tethered smart device.

Figure 3:
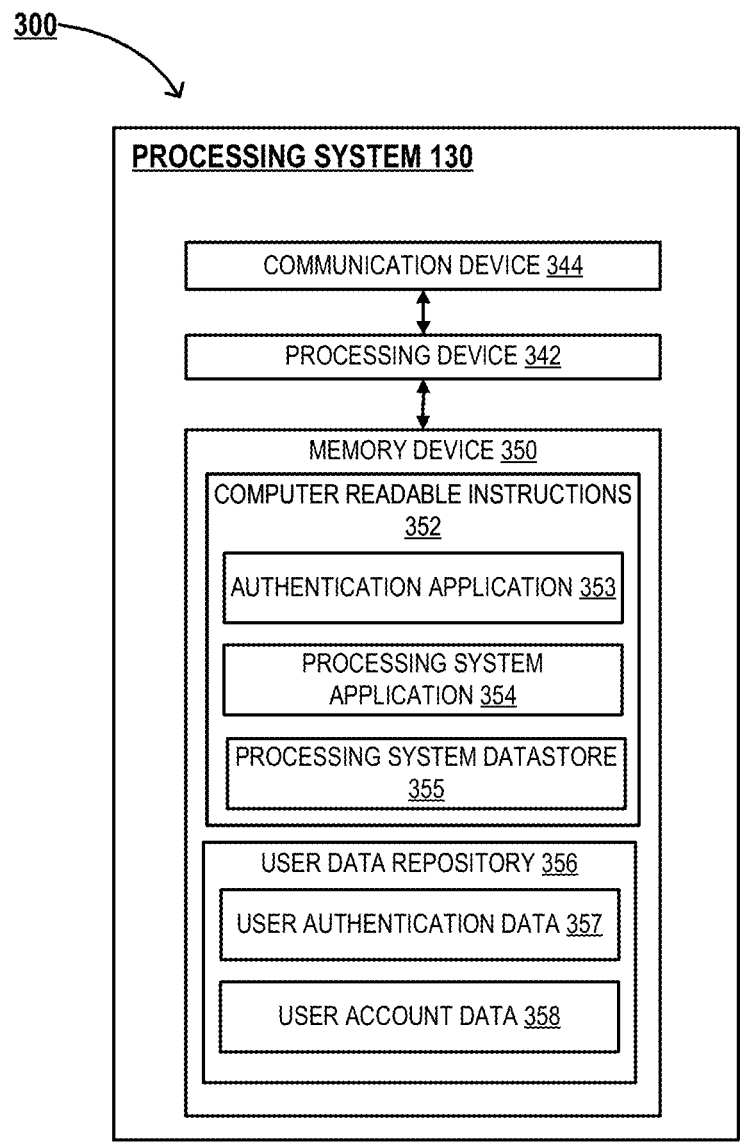
FIG. 3 illustrates a block diagram 300 of a processing system 130, in accordance with some embodiments of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processing device 210 of the tethered smart device 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the tethered smart device 120, the authentication database 118, the entity system 116, the sensor devices 112, and visual capture devices 114, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user mobile device 104 or the display device 280 of the tethered smart device 120. As another example, the user interface may be provided on the tethered smart device 120 that may be controlled by the processing system 130 either directly or via the processing device 210 of the tethered smart device 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the tethered smart device 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
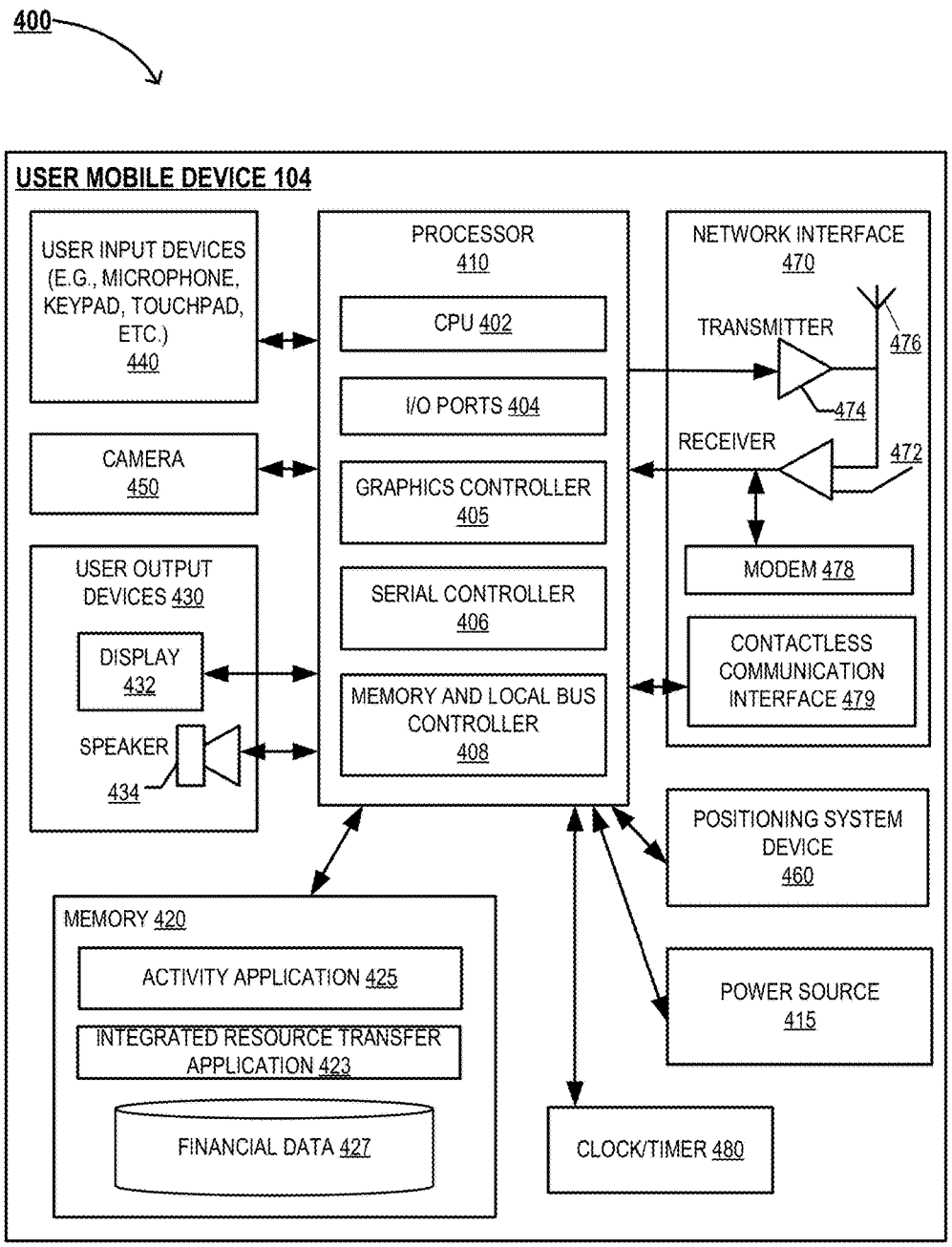
FIG. 4 illustrates a block diagram 400 of a user mobile device 104, in accordance with some embodiments of the invention.

FIG. 4 illustrates a block diagram 400 of the user mobile device 104, such as a smartphone device, in accordance with some embodiments of the invention. A "user mobile device" 104 may be any mobile communication device, such as a cellular telecommunications device (i.e., a cell phone or mobile phone), personal digital assistant (PDA), a mobile Internet accessing device, or another user mobile device including, but not limited to portable digital assistants (PDAs), pagers, mobile televisions, gaming devices, laptop computers, cameras, video recorders, audio/video player, radio, GPS devices, any combination of the aforementioned devices.

The user mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a integrated resource transfer application 423, or a web browser application. The activity application 425 may then allow the user mobile device 104 to transmit and receive data and instructions from the tethered smart device 120 (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The integrated resource transfer application 423 and the financial data module 427, together may include the necessary circuitry to provide token storage and transmission functionality, transmitter device signal encoding and decoding functionality to the user mobile device 104, for secure transmission of financial and authentication credential tokens via the contactless communication interface 479 to the tethered smart device 120. That said, in some embodiments the integrated resource transfer application 423 is pre-installed on the user mobile device 104, while in other embodiments, the tethered smart device 120 may transmit and cause installation of the application 423 based on determining that the user mobile device 104 does not comprise the application 423, when the user mobile device is within a predetermined distance from the tethered smart device 120.

The processor 410 may be configured to use the network interface device 470 to communicate with one or more other devices on a network 101 such as, but not limited to the tethered smart device 120 and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the user mobile device 104 may be configured to operate with one or more air interface standards, communication protocols, modulation types, and access types. By way of illustration, the user mobile device 104 may be configured to operate in accordance with any of a number of first, second, third, and/or fourth-generation communication protocols and/or the like. For example, the user mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user mobile device 104 may also be configured to operate in accordance with non-cellular communication mechanisms, such as via a wireless local area network (WLAN) or other communication/data networks. The user mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the user mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the user mobile device 104 to receive data from the user 102, may include any of a number of devices allowing the user mobile device 104 to receive data from a user 102, such as a keypad, keyboard, touch-screen, touchpad, microphone, mouse, joystick, other pointer device, button, soft key, and/or other input device(s).

The user mobile device 104 may further include a power source 415 (e.g., a rechargeable DC power source). Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a user mobile device 104 may be a battery, such as a lithium battery, a nickel-metal hydride battery, or the like, that is used for powering various circuits, for example, the transceiver circuit, and other devices that are used to operate the user mobile device 104. Alternatively, the power source 415 may be a power adapter that can connect a power supply from a power outlet to the user mobile device 104. In such embodiments, a power adapter may be classified as a power source "in" the user mobile device 104.

The user mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the tethered smart device 120 performing one or more steps described herein in conjunction with other devices and systems, either automatically based on executing computer readable instructions of the memory device 230, or in response to receiving control instructions from the processing system 103. In some instances, the system refers to the processing system 103. In some instances, the system refers to the devices and systems on the network environment 100 of FIG. 1. In some instances, the system refers to the user mobile device 104. The features and functions of various embodiments of the invention are be described below in further detail.

In some instances, the user mobile device 104 comprises sensor devices 440 comprising biometric sensors for capturing parameters associated with the user, such as fingerprint scanners, voice recognition sensors, facial recognition sensors, heart rate sensors, user stress level sensors and the like. These biometric sensors 440 are configured to retrieve, receive, analyze and or validate biometric credentials associated with the user. In this regard, the biometric sensors 440 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 5:
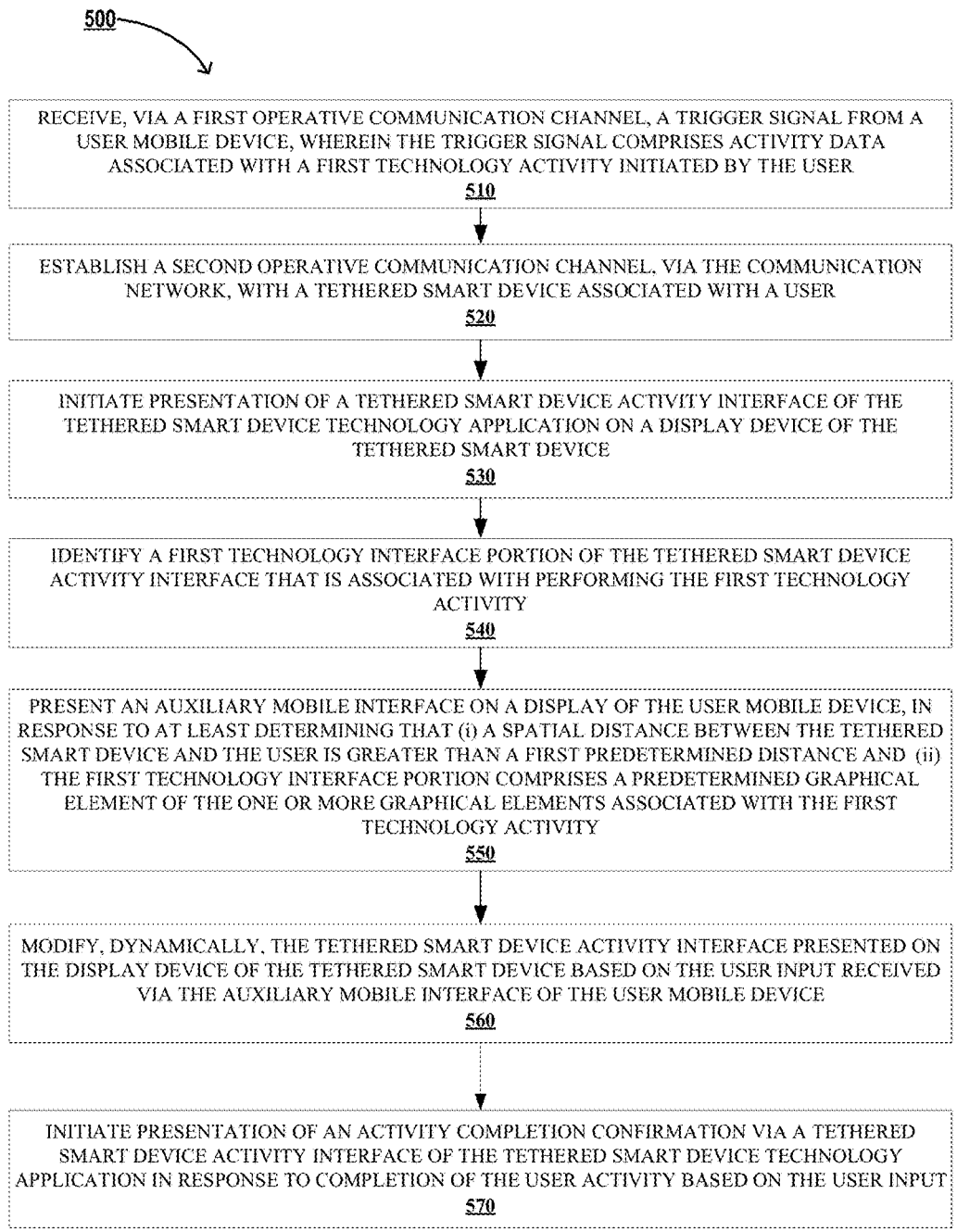
FIG. 5 illustrates a high level process flow 500 for technology application restructuring and deployment for home receiver integration, in accordance with some embodiments of the invention.

FIG. 5 illustrates a high level process flow 500 for technology application restructuring and deployment for home receiver integration, in accordance with some embodiments of the invention. As discussed previously, a user is typically associated with a user mobile device 104 (e.g., smartphone 104). As alluded to previously, the functionality of the user mobile device 104 of the present invention is fundamentally transformed herein to convert the user mobile device into a secure channel identifier and central control for performing user activities and integrating tethered smart devices 120. Specifically, the present invention configures the user mobile device a central control for seamless multi-channel operative communication across a plurality of networked devices for performing network activities, which would not be possible otherwise.

Specifically, the present invention transforms the user mobile device to function as a cross-channel remote for seamless cross-channel operative communication and engagement. As an example, the user mobile device functions as a first node or point of contact for a user. The present invention may then present an interface on a display device of the user mobile device (e.g., interface 600 illustrated in FIG. 6), such as an interface of a personal digital assistant and knowledge navigator, or another smart interface. This interface may be initiated when the user seeks to perform a network activity, or may be initiated, proactively, based on determining, via a trigger signal, that the user may be required to perform a network activity. The present invention then configures the user mobile device to communicate with a variety of networked devices (e.g., tethered smart device 120), via cross-channel communication, based on identifying the one or more network activity channels suitable for or required for the determined network activity. In response, the present invention seamlessly blends and amalgamates functionality and interfaces of disparate tethered smart device 120 onto the user mobile device, thereby configuring the user mobile device as a secure temporary remote controller for the networked devices. Here, the present invention transforms the user mobile device as a quasi-network controller for controlling the various networked devices, for example, by transmitting control signals from the user mobile device to the networked devices and receiving response signals from the networked devices and the user mobile device. In addition, the present invention configures the user mobile device for pre-staging and customization of these amalgamated interfaces, for the purposes of performing the network activities. As used henceforth, a "system" performing an activity step refers to the processing system 103 performing the activity step itself and/or the processing system 130 transmitting control instructions to the tethered smart device 120 and/or the user mobile device 104 to cause the device(s) to perform the activity step. As such the system configures the user mobile device as a remote control for allowing the user to perform a first technology activity using the tethered smart device technology application, via the user mobile device.

As indicated by block 510, in some instances, the system (e.g., processing system 103), for example, via the tethered smart device 120 and/or the user mobile device 104, receives a trigger signal from a first networked device (e.g., user mobile device) of the plurality of networked devices. Typically, the system establishes a first operative communication channel, via the network 101, with the user mobile device 104. After requisite authentication and/or based on determining that the user seeks to initiate a technology activity, the system typically presents a user mobile device interface of a user mobile device technology application (e.g., interface 610 illustrated in FIG. 6). The user may then provide activity data associated with the technology activity via the user mobile device interface (e.g., interface 610 illustrated in FIG. 6). As such, the system receives via the first operative communication channel, a trigger signal from the user mobile device 104. This trigger signal typically comprises activity data associated with a first technology activity initiated by the user.

Typically, the system, for example, via a communication device of the system, is configured to establish operative communication with a plurality of networked devices via an electronic communication network (e.g., network 101). The plurality of networked devices (e.g., the first networked device) may include one or more of user mobile devices associated with users (e.g., user mobile device 104, and/or positioning system device 460 of the user mobile device), the tethered smart devices (e.g., tethered smart device 120), sensor devices (e.g., sensor devices 112), one or more visual capture devices (e.g., devices 114), proximity sensors and position sensors described previously, and/or the like. In some embodiments, receiving the indication of initiation of the technology activity comprises at least one of a user input provided at the user mobile device, as described above.

Figure 6:
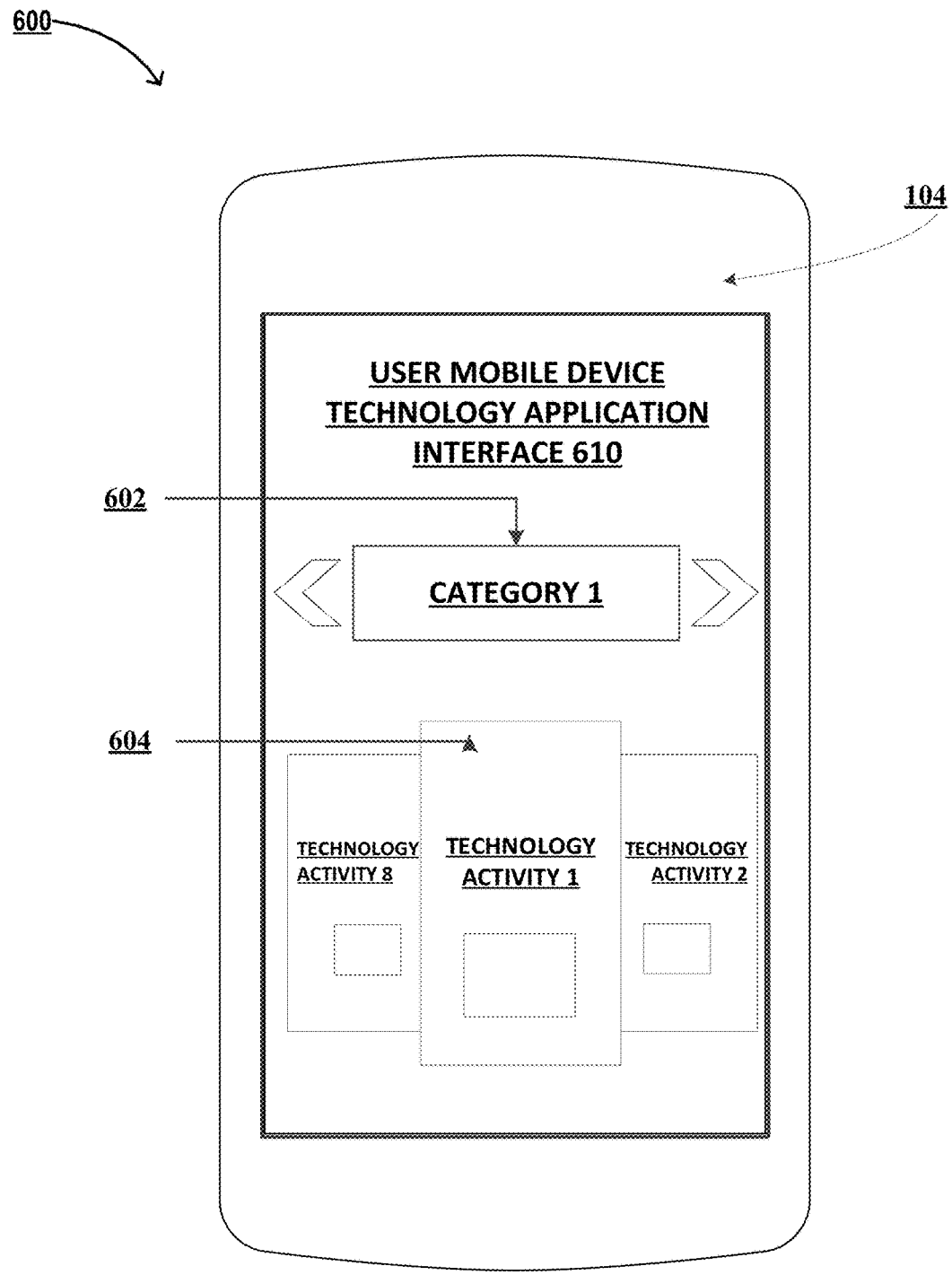
FIG. 6 illustrates a user mobile device interface 600 of a user mobile device 104, in accordance with some embodiments of the invention.

Here, the system may receive the indication of initiation of the technology activity from the user mobile device based on user input, such as textual input, gestures on a touch screen, predetermined special movement of the user mobile device by the user, audio commands, and/or the like (e.g., at the mobile device interface 610 of FIG. 6). In other instances, the system may receive an indication from a smart device, such as a smart car, a smart door, or a smart television, indicating that the user has performed or initiated one or more predetermined activities associated with the smart device, based on prior user permissions and settings. In yet other instances, an indication of initiation of the technology activity comprising a user geographic location signal is received from a positioning device of the user mobile device (e.g., positioning system device 460 of the user mobile device) when the user location coordinates are associated with a predetermined location or area or within a predetermined proximity of another device. In some embodiments, the system may identify initiation of the technology activity based on analyzing user calendar data received from a calendar application stored on the user mobile device. In some embodiments, the indication of initiation of the technology activity may be received from an external system (e.g., social networking systems, merchant systems, and the like). In some embodiments, the indication of initiation of the technology activity is transmitted by the proximity transmitter device when the user is within a predetermined proximity of the proximity transmitter device (e.g., proximity sensors and position sensors described previously). In some embodiments, the indication of initiation of the technology activity is typically received in real time or near-real time of the user seeking to initiate a network activity. In response to identifying an indication of initiation of the technology activity by the user, the system may present the mobile device interface for receiving activity data (e.g., via the mobile device interface 610 of FIG. 6).

In some embodiments, the trigger signal comprises activity data associated with the user. The activity data may comprise user information, user resource (account) information, device location, time period, user preferences, user permissions, and/or other information relevant to the network activity that the user seeks to perform.

Next, as indicated by block 520, based on analyzing the trigger signal, the system is configured to identify a network activity initiated by the user. Here, the system is also configured to identify a suitable home receiver/tethered smart device for facilitating the user activity initiated by the user. For example, the system may identify a tethered smart device (e.g., smart television) that is at the same geographical location (e.g., user's home) as the user mobile device used to initiate the technology activity (e.g., based on retrieved GPS data from the user mobile device). In some instances, the system may also identify a most suitable tethered smart device out of a plurality of tethered smart devices at the user's location, for example, based on user preferences, based on suitability of the tethered smart device for the initiated technology activity, and/or the like. The system may then establish a second operative communication channel, via the communication network, with the tethered smart device associated with the user. As discussed previously, in some embodiments, the tethered smart device is a smart television device that is functionally tethered to an external power source comprising an energized electrical circuit. In some embodiments, the tethered smart device is a smart speaker device having the display device, wherein the smart speaker device is functionally tethered to an external power source comprising an energized electrical circuit. As illustrated by block 530, the system then initiates a presentation of a tethered smart device activity interface (for example, interface 750 of FIG. 7, interface 850 of FIG. 8, and the like) of the tethered smart device technology application on a display device 280 of the tethered smart device 120.

In some embodiments, as discussed previously, the system is configured to determine that a geographical location of the tethered smart device is the same as a geographical location of the user mobile device such that the tethered smart device is located within a predetermined near field communication range of the user mobile device. Here, the system may then transmit a trigger activation signal to the user mobile device. This trigger activation signal is structured to cause an offline tethered smart device to connect to the communication network. Typically, the trigger activation signal is configured to cause the user mobile device to establish a near field operative communication (NFC) channel or another wireless communication channel, such as a Wi-Fi communication channel, (via the communication network) with the tethered smart device. The trigger activation signal is configured to cause the user mobile device to transmit, via the near field communication channel or other wireless channel, the trigger activation signal to the tethered smart device. The trigger activation signal then causes the offline tethered smart device to connect to the communication network 101, using a suitable communication channel (e.g., second operative communication channel). The trigger activation signal is further configured to cause the user mobile device to transmit, via the near field communication channel or another wireless channel, an interface control signal to the tethered smart device. The interface control signal is structured to cause the tethered smart device to present a customized the tethered smart device activity interface (for example, interface 750 of FIG. 7, interface 850 of FIG. 8, and the like) of the tethered smart device technology application on the display device of the tethered smart device. The interface control signal customizes the tethered smart device activity interface for the initiated technology activity based on the activity data provided by the user and or activity data determined by the system.

In some embodiments, the system transmits (for example, via the user mobile device described above or directly via the second operative communication channel) an interface control signal to the tethered smart device. This signal causes the tethered smart device to overlay the tethered smart device activity interface (for example, interface 750 of FIG. 7, interface 850 of FIG. 8, and the like) of the tethered smart device technology application on an existing display device interface (e.g., an interface or audio/video currently being viewed by the user) of the tethered smart device.

As described above and illustrated by block 530, the system typically initiates the presentation of a tethered smart device activity interface (for example, interface 750 of FIG. 7, interface 850 of FIG. 8, and the like) of the tethered smart device technology application on a display device 280 of the tethered smart device 120. Here, the system may transform an existing online, browser, or mobile technology application/widget (e.g., mobile technology application stored on the user mobile device) for presentation on the display device 280 of the tethered smart device 120. Initially, the system identifies application parameters of the tethered smart device 120. These application parameters include operating system parameters (e.g., type of operating system, supported user interface markup language, compatible syntax of application code, available functions, and the like), display device parameters of the display device 280 of the tethered smart device (e.g., resolution of the screen, type of display (LCD, LED, touchscreen, and the like), screen dimensions, available functions, and the like), and/or user preferences (e.g., user images/backgrounds, preferred icon sizes, preferred application layout, preferred page layout, preferred aesthetics, preferred page hierarch, and/or the like). The system then configures/transforms the existing online, browser, or mobile technology application/widget (e.g., mobile technology application stored on the user mobile device) to the tethered smart device technology application such that at least the tethered smart device activity interface of the tethered smart device technology application matches the application parameters of the tethered smart device. In some embodiments, the system configures the tethered smart device activity interface such that an application resolution of the tethered smart device activity interface matches a resolution of the display device parameters of the tethered smart device. In some embodiments, the system modifying display sizes and display positions of the one or more graphical elements (e.g., action buttons, input/output graphical elements, backgrounds, scroll buttons, radio buttons, and the like) such that tethered smart device activity interface is presented on the display device of the tethered smart device without requiring scrolling by the user. Here the system typically modifies display sizes of the one or more graphical elements and modifies the layout of the elements. This may be achieved by varying the physical sizes of the elements when displayed, rearranging the elements in the available screen space, converting pre-determined textual content (and/or image content) of the one or more graphical elements into a pop-up interface that can be activated by the user to access the textual content using an associated link element that is inserted in the tethered smart device activity interface.

In some embodiments, the system authenticates the user and/or the network devices (user mobile device and the tethered smart device) for the use activity, prior to presenting the tethered smart device activity interface. Here, the system may access/retrieve a mobile device security identifier stored in the mobile device. Next, the system may access a tethered smart device security identifier stored in the tethered smart device. The system may then validate user authentication credentials (e.g., textual credentials (username/passcode) or biometric credentials) received at the user mobile device from the user. The system may authenticate/authorize the performance first technology activity, based on at least successful validation of (i) the user authentication credentials, (ii) the mobile device security identifier, and (iii) the tethered smart device security identifier. The system may then allow the user to perform the first technology activity using the tethered smart device technology application, via the user mobile device in response to successful authentication of the first technology activity.

Subsequently, at block 540, the system presents the tethered smart device activity interface to the user on the display device of the tethered smart device. The user may view the presented data, perform one or more steps and/or request additional data using the presented tethered smart device activity interface. Next, the system identifies a first technology interface portion of the tethered smart device activity interface that is associated with performing the first technology activity. Typically, the first technology interface portion comprises one or more graphical elements associated with performing the first technology activity. For example, the first technology interface portion comprises one or more graphical elements that are required to be acted upon by the user for performing the first technology activity.

Figure 7:
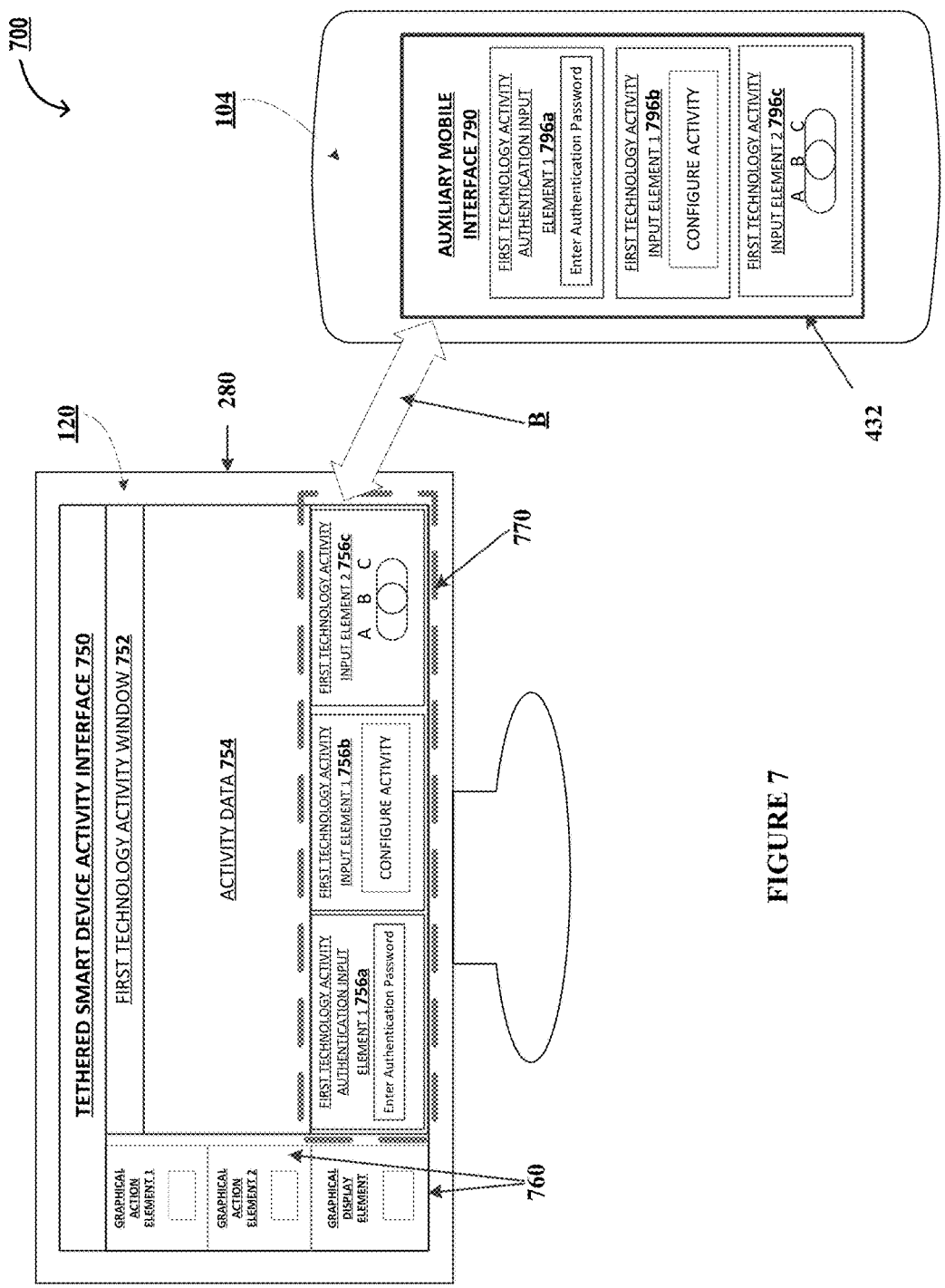
FIG. 7 illustrates a multi-channel interface environment 700 for performing a technology activity, in accordance with some embodiments of the invention.
Figure 8:
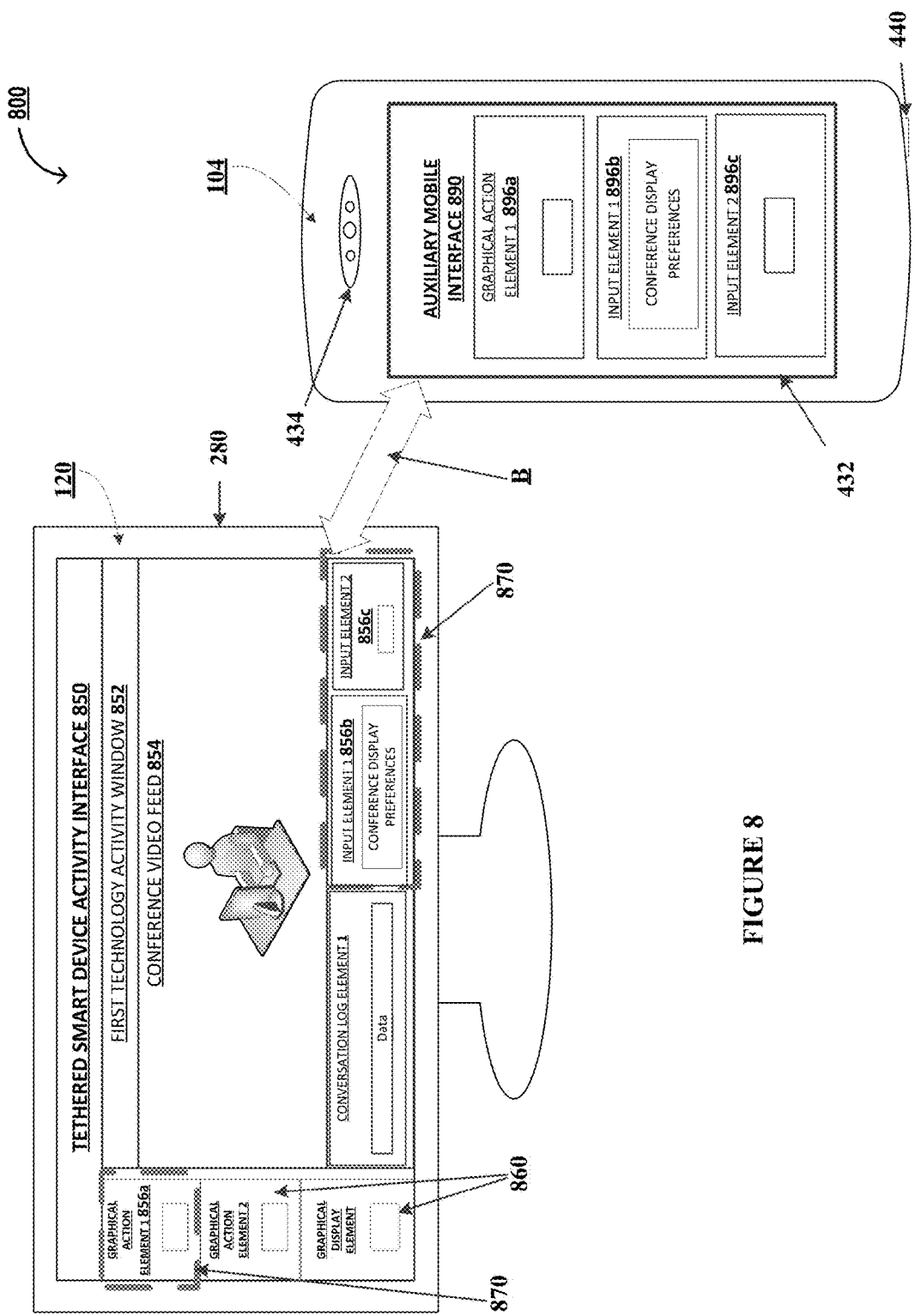
FIG. 8 illustrates a multi-channel interface environment 800 for performing a technology activity, in accordance with some embodiments of the invention.

For example, as illustrated by FIG. 7, the system identifies a first technology interface portion 770 of the tethered smart device activity interface 750, identified by the system, which comprises one or more graphical elements (756a-c) that are required for performing the technology activity. As another example, FIG. 8 illustrates a first technology interface portion 870 (comprising a plurality of discrete areas) of the tethered smart device activity interface 750 that comprises one or more graphical elements (856a-c) that are required for performing the technology activity. Typically, one or more graphical elements comprise an input type elements for receiving user input (e.g., elements 756a-c illustrated in FIG. 7, and elements 856a-c illustrated in FIG. 8). Also, one or more graphical elements comprise security type elements that may display user sensitive data that the user wishes not to be displayed on the tethered smart device (e.g., element 756a illustrated in FIG. 7).

As discussed, in some embodiments, identifying the first technology interface portion of the tethered smart device activity interface that is associated with performing the first technology activity comprises determining, in real time, that the first technology interface portion comprises at least a portion of graphical elements required for performing at least a subsequent step (or all the steps) of the first technology activity.

In some embodiments, or in combination with the above, the system identifies the first technology interface portion of the tethered smart device activity interface based on tracking the user's gaze or vision. Here, as discussed previously, the tethered smart device comprises optical sensor devices 290 for tracking an area of gaze of the user's eyes when the user is viewing the tethered smart device activity interface (e.g., interfaces 750, 850) presented on the display device of the tethered smart device. Typically, the system is configured to transmitting a sensing trigger signal to the tethered smart device that is structured to cause the optical sensor device 290 to transmit a light signal comprising infrared and/or near-infrared light. This light signal that is incident on the user's eyes, is reflected by the cornea, lens of the eye, retinal bold vessels, and/or the pupils of the user's eyes. The optical sensor device then receives the reflected light signal reflected from the user's eyes (e.g., based on instructions of a recipient trigger signal transmitted by the system). The processing system 130 and/or the tethered smart device 120 may then determine the area of gaze of the user's eyes based on analyzing the reflected light signal. Here, the processing system 130 and/or the tethered smart device 120 may compute, continuously and in real-time, a point of regard of the user's gaze on the surface of the display device of the tethered smart device based on at least determining a gaze direction of the user's eyes. The processing system 130 and/or the tethered smart device 120 may the correlate the computed area of gaze with the first technology interface portion currently being displayed by the tethered smart device in that area of gaze. Subsequently, the system may identify the graphical elements falling within the user's gaze and hence identify the first technology interface portion (770, 870) such that the graphical elements are included in the first technology interface portion (770, 870). In addition, in some embodiments, the system may include only those graphical elements in the first technology interface portion (770, 870) on which the user's gaze is incident for longer than a predetermined time period. For example, the system may determine that the user has been stating at a data element or an input element for a certain time period, and ascertain that the user is trying to read the data element or provide input using the input element, respectively. As such, the system identifies the first technology interface portion of the tethered smart device activity interface based on at least determining that (i) the first technology interface portion matches the area of gaze of the user's eyes, and (ii) the user viewed the area of gaze for at least a predetermined viewing time period.

In some embodiments, or in combination with the above, the tethered smart device comprises optical sensor devices 290 for determining spatial or three dimensional gestures performed by the user. The processing system 130 and/or the tethered smart device 120 may the correlate the three-dimensional special movement of the predetermined gesture performed by the user with the first technology interface portion currently being displayed by the tethered smart device. For example, attributes of particular gesture (e.g., 2 dimensional span of movement, type of movement, and the like) may be correlated with corresponding portions of the interface currently being displayed by the tethered smart device, e.g., based on analyzing a live video feed of the user.

Here, as indicated by block 550, the system presents, dynamically, an auxiliary mobile interface on a display of the user mobile device, the auxiliary mobile interface comprising the determined the first technology interface portion of the current display of the tethered smart device. Here, typically, the system initially determines (e.g., using sensor device 290 as described previously) whether a spatial distance between the tethered smart device and the user is greater than a first predetermined distance (typically falling within limits of an optimal distance range). In the event that the system determines that the spatial distance between the tethered smart device and the user is lesser than the first predetermined distance, the system may request the user to utilize the touch screen or other input/output devices of the smart tethered device or request the user to step back so that the user has an optimal view of the display of the tethered device. In some embodiments, determining that the spatial distance between the tethered smart device and the user is greater than the first predetermined distance is based on at least one of (i) determining, via received location signals from a positioning device of the mobile device, that the spatial distance between the tethered smart device and the user is greater than the first predetermined distance, and (ii) identifying, via an image capture device of the tethered smart device, that the spatial distance between the tethered smart device and the user is greater than the first predetermined distance.

The system also determines whether the first technology interface portion comprises a predetermined graphical element (e.g., an element requiring input from the user, an element associated with secure data of the user, and the like) of the one or more graphical elements associated with the first technology activity. The predetermined graphical element of the one or more graphical elements associated with the first technology activity comprises an input type component structured to facilitate receiving an user input associated with the first technology activity upon activation (e.g., selection by the user), a security type component structured to output predetermined secure information associated with the first technology activity to the user, and/or the like.

As such, the system presents the auxiliary mobile interface (e.g., auxiliary mobile interface 790 illustrated in FIG. 7, auxiliary mobile interface 890 illustrated in FIG. 8) on a display of the user mobile device in response to at least determining that (i) a spatial distance between the tethered smart device and the user is greater than a first predetermined distance and (ii) the first technology interface portion comprises a predetermined graphical element of the one or more graphical elements associated with the first technology activity. In some embodiments, the system may overlay the auxiliary mobile interface on an existing display device interface of the user mobile device. Typically, overlaying the auxiliary mobile interface comprises disabling the existing display device interfaces such that only the auxiliary mobile interface is active.

This auxiliary mobile interface comprises at least the predetermined graphical element of the first technology interface portion (or the one or more elements from the determined first technology interface portion). The auxiliary mobile interface is configured such that it retains the functionality of the graphical elements (796a-c, 896a-c) such that the user may compete the requisite steps of the technology activity. Moreover, the system may modify the arrangement, size, position, and other attributes of the one or more graphical elements so that the one or more graphical elements are compatible for presentation and activation on the user mobile device (e.g., as depicted by the auxiliary mobile interface 790 illustrated in FIG. 7, auxiliary mobile interface 890 illustrated in FIG. 8). As another example, the system may alter the at least one graphical element to include at least a portion of a user image retrieved from a storage location of the user mobile device based on received user permissions, such as an image of the user, images associated with the location of the network activity based on user's prior activities, and the like. As another example of the amalgamated interface, the system may add an additional functional interface element, such as a drop down menu from an interface of a first networked device and alter an existing graphical element (e.g., icons) to substitute graphical elements (e.g., icons) retrieved from the tethered smart device interface.

In some embodiments, the initiated technology activity involves establishing an audio-video conference between the user and a specialist associated with the technology activity. In this regard, the system is configured to establish a wireless communication channel between the tethered smart device and an entity system associated with the specialist. The system may then establishing an audio-video conference between the user and the specialist by leveraging an existing conference application of the tethered smart device or by transmitting and activating a new conference application. Here, the system may present a real-time feed of the specialist, captured by the entity system, at the tethered smart device 120 (e.g., conference video feed 854 illustrated in FIG. 8).

In this regard, in some embodiments, the system may activate a microphone device 440 of the user mobile device 104 for use with the presented auxiliary mobile interface for conducting the conference with the specialist. The system may receive the audio user input at the auxiliary mobile interface via the microphone device, and transmitting, the received audio input to the entity system, thereby improving the sound quality in comparison with the audio captured by the distant tethered smart device. The video feed may be continued to be presented on the tethered smart device, as illustrated by FIG. 8. Moreover, in some embodiments, the system may activate a speaker device 434 of the user mobile device 104 for use with the presented auxiliary mobile interface. The system may receive an audio signal from the entity system comprising a real-time audio feed of the specialist, and present the received audio signal to the user via the speaker device of the user mobile device.

As alluded to previously, the channel interface is configured as a remote control for allowing the user to perform the network activity using the user mobile device and cross-channel communication, seamlessly, via a single interface, without requiring the user to navigate multiple interfaces and applications.

Next, the system may receive user input provided by the user using the graphical elements of the auxiliary mobile interface (790, 890) for the first technology activity. In response, as illustrated by block 560 of FIG. 5, the system may then modify, dynamically, the tethered smart device activity interface presented on the display device of the tethered smart device, in accordance with the user input received via the auxiliary mobile interface. For example, the system may modify the graphical element on the tethers smart device display to indicate that the user has provided certain input using the counterpart graphical element on the user mobile device.

Moreover, the system may then transmit, a control signal to the user mobile device based on completion of the technology activity, for example, for causing the end of the operative coupling of the devices to maintain the security of the devices, to reinstate existing user interfaces or control of the user mobile device, to render the user mobile device back to its original state (e.g., offline state, resuming stopped internal operations), and/or the like. Likewise, as indicated by block 570, the system may initiate a presentation of an activity completion confirmation, via a tethered smart device activity interface of the tethered smart device technology application, in response to completion of the user activity (e.g., completion of a payment transfer, completion of a conference with a specialist or another user, acceptance of an incentive/offer by the user, and the like).

FIG. 6 illustrates a user mobile device interface 600 of a user mobile device 104, in accordance with some embodiments of the invention. As described with respect to block 510 of FIG. 5, in some instances, the system establishes a first operative communication channel, via the network 101, with the user mobile device 104. After requisite authentication and/or based on determining that the user seeks to initiate a technology activity, the system typically presents a user mobile device interface 610 of a user mobile device technology application. The user mobile device technology application may be pre-installed on the user mobile device 104, and the system may activate the application and cause the application to present a suitable mobile interface for performing the technology activity. Alternatively, the system may transmit, install, and then activate the application for presenting the suitable mobile interface. The user may then provide activity data associated with the technology activity via the user mobile device interface using suitable graphical user interface elements (e.g., graphical user interface elements 602, 604). For example, the system may identify one or more activities that the user may seek to initiate, for example, based on historical user activity or based on current actions of the user. The system may then present the one or more activities for the user to choose from, as illustrated by the technology activity selection (1, 2, 8) of the graphical element 604. As such, the mobile device application may then transmit, via the first operative communication channel, a trigger signal from the user mobile device 104. This trigger signal typically comprises activity data associated with a first technology activity provided by the user using the graphical interface elements of the user mobile device application 610.

FIG. 7 illustrates a multi-channel interface environment 700 for performing a technology activity, in accordance with some embodiments of the invention. As discussed previously with respect to block 530 of FIG. 5, the system initiates a presentation of a tethered smart device activity interface 750 of the tethered smart device technology application on a display device 280 of the tethered smart device 120, as illustrated by FIG. 7. The tethered smart device activity interface 750 may comprise a first technology activity window 752 comprising one or more graphical elements associated with the first technology activity imitated by the user. The one or more graphical elements associated with the first technology activity may comprise an activity data element 754 displaying data and/or images associated with the technology activity, a first technology activity authentication input element 1 (756*a*) associated with receiving user authentication credentials prior to performing the technology activity, a first technology activity input element 1 (756*b*) structured to allow the user to configure or provide parameters for the technology activity (e.g., structured to generate a new pop-up window that allows a provide payment and account details for a payment transfer), and/or a first technology activity input element 2 (756*c*) comprising a toggle switch element that is structured to allow the user to modify one or more settings of the technology activity or modify permissions. The tethered smart device activity interface 750 may further comprise additional graphical elements 760 as illustrated that may or may not be associated with the first technology activity.

As discussed previously with respect to FIG. 5, the system typically identifies the first technology interface portion comprising one or more graphical elements associated with performing the first technology activity, either based on identifying the particular graphical elements that need to be acted upon for performing subsequent steps or the technology activity itself (e.g., using historical data or analyzing input/output steps of the activity that require user interaction), based on tracking the user's area of gaze, and/or based on recognizing user gestures. As illustrated by FIG. 7, the system may identify the first technology interface portion 770 comprising the one or more graphical elements of the first technology activity authentication input element 1 (756*a*) associated with receiving user authentication credentials prior to performing the technology activity, the first technology activity input element 1 (756*b*) structured to allow the user to configure or provide parameters for the technology activity (e.g., structured to generate a new pop-up window that allows a provide payment and account details for a payment transfer), and/or a first technology activity input element 2 (756*c*) comprising a toggle switch element that is structured to allow the user to modify one or more settings of the technology activity or modify permissions.

Next, the system may present the auxiliary mobile interface 790, illustrated in FIG. 7, on a display 432 of the user mobile device 104 in response to at least determining that (i) a spatial distance between the tethered smart device and the user is greater than a first predetermined distance and (ii) the first technology interface portion comprises a predetermined graphical element (input component elements 756*b*-*c*, and/or security component element 756*a*) of the one or more graphical elements associated with the first technology activity, indicated by arrow B. In some embodiments, the system may overlay the auxiliary mobile interface on an existing display device interface of the user mobile device. Typically, overlaying the auxiliary mobile interface comprises disabling the existing display device interfaces such that only the auxiliary mobile interface is active.

This auxiliary mobile interface 790 comprises at least the predetermined graphical element of the first technology interface portion (or the one or more elements from the determined first technology interface portion). The auxiliary mobile interface is configured such that it retains the functionality of the graphical elements (796a-c) of the portion 770 such that the user may compete the requisite steps of the technology activity. Moreover, the system may modify the arrangement, size, position, and other attributes of the one or more graphical elements so that the one or more graphical elements are compatible for presentation and activation on the user mobile device as illustrated by corresponding elements of the first technology activity authentication input element 1 (796a) associated with receiving user authentication credentials prior to performing the technology activity, the first technology activity input element 1 (796b) structured to allow the user to configure or provide parameters for the technology activity (e.g., structured to generate a new pop-up window that allows a provide payment and account details for a payment transfer), and/or a first technology activity input element 2 (796c) comprising a toggle switch element that is structured to allow the user to modify one or more settings of the technology activity or modify permissions. As another example of the amalgamated interface, the system may add an additional functional interface element, such as a drop down menu from an interface of a first networked device and alter an existing graphical element (e.g., icons) to substitute graphical elements (e.g., icons) retrieved from the tethered smart device interface.

The user input provided by the user by interacting with the elements of the auxiliary mobile interface 790 are conveyed to, and reflected on the tethered smart device activity interface 750 in real time or near real time, e.g., using the Near Field communication channel. For example, the movement of the toggle switch at the element 796c of the auxiliary mobile interface 790 is reflected on the toggle switch of the element 756c of the tethered smart device activity interface. Once the requisite user input is received the system processed with completing the initiated technology activity.

Similarly, FIG. 8 illustrates a multi-channel interface environment 800 for performing a technology activity, in accordance with some embodiments of the invention. In a similar manner as discussed previously with FIG. 7, the system initiates a presentation of a tethered smart device activity interface 850 of the tethered smart device technology application on a display device 280 of the tethered smart device 120, as illustrated by FIG. 8. The functions and features of the multi-channel interface environment 800 are similar to that of the multi-channel interface environment 700. However, FIG. 8 illustrates an example of the initiated first technology activity involving establishing an audio-video conference between the user and a specialist (or another user) associated with the technology activity. In this regard, the system is configured to establish a wireless communication channel between the tethered smart device and an entity system associated with the specialist. The system may then establishing an audio-video conference between the user and the specialist by leveraging an existing conference application of the tethered smart device or by transmitting and activating a new conference application. Here, the system may present a real-time feed 854 of the specialist (or other user), captured by the entity system, at the tethered smart device 120 (e.g., conference video feed 854 of the first technology activity window 852, illustrated in FIG. 8). The tethered smart device activity interface 850 may comprise a first technology activity window 852 comprising one or more graphical elements associated with the first technology activity imitated by the user. The one or more graphical elements associated with the first technology activity may comprise an conference view feed 854, a conversation log element 1 associated with displaying transcripts of the conference, a first technology activity input element 1 (856b) structured to allow the user to configure or provide parameters for the conference, and/or an input element 2 (856c) structured to allow the user to modify one or more settings of the technology activity or modify permissions. The tethered smart device activity interface 750 may further comprise additional graphical elements 860 as illustrated.

As illustrated by FIG. 7, the system may identify the first technology interface portion 870 comprising the one or more graphical elements comprising the first graphical action element 1 (856a) (which may be require for the activity although it is separate from the activity window 852), the input element 1 (856b), and/or the input element 2 (856c). Next, the system may present the auxiliary mobile interface 890, illustrated in FIG. 8, on a display 432 of the user mobile device 104 comprising functional counterparts 896a-896c of the predetermined graphical elements 856a-c. In addition, as discussed previously, in some embodiments, the system may activate a microphone device 440 of the user mobile device 104 for use with the presented auxiliary mobile interface for conducting the conference with the specialist. The system may receive the audio user input at the auxiliary mobile interface via the microphone device, and transmitting, the received audio input to the entity system, thereby improving the sound quality in comparison with the audio captured by the distant tethered smart device. The video feed may be continued to be presented on the tethered smart device, as illustrated by FIG. 8. Moreover, in some embodiments, the system may activate a speaker device 434 of the user mobile device 104 for use with the presented auxiliary mobile interface. The system may receive an audio signal from the entity system comprising a real-time audio feed of the specialist, and present the received audio signal to the user via the speaker device of the user mobile device.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for technology application restructuring and deployment for home receiver integration, wherein the system is configured to provide a technology application on a functionally tethered smart device to facilitate performing user activities, the system comprising:
   a memory device with computer-readable program code stored thereon;
   a communication device, wherein the communication device is configured to establish operative communication with a plurality of networked devices via a communication network;
   a processing device operatively coupled to the memory device and the communication device, wherein the processing device is configured to execute the computer-readable program code to:
      receive, via a first operative communication channel of the communication network, a trigger signal from a user mobile device associated with a user, wherein the trigger signal comprises activity data associated with a first technology activity initiated by the user;
      establish a second operative communication channel, via the communication network, with a tethered smart device associated with the user;
      transmit, via the second operative communication channel, a tethered smart device technology application to the tethered smart device;
      initiate presentation of a tethered smart device activity interface of the tethered smart device technology application on a display device of the tethered smart device;
      identify a first technology interface portion of the tethered smart device activity interface that is associated with performing the first technology activity, wherein the first technology interface portion comprises one or more graphical elements associated with the first technology activity;
      in response to at least determining that (i) a spatial distance between the tethered smart device and the user is greater than a first predetermined distance and (ii) the first technology interface portion comprises a predetermined graphical element of the one or more graphical elements associated with the first technology activity, present an auxiliary mobile interface on a display of the user mobile device, wherein the auxiliary mobile interface comprises the predetermined graphical element of the first technology interface portion;
      receive, via the auxiliary mobile interface of the user mobile device, a user input associated with the first technology activity;
      modify, dynamically, the tethered smart device activity interface presented on the display device of the tethered smart device based on the user input received via the auxiliary mobile interface of the user mobile device, wherein modifying the tethered smart device activity interface comprises modifying the one or more graphical elements;
      initiate presentation of an activity completion confirmation via the tethered smart device activity interface of the tethered smart device technology application in response to completion of the user activity based on the user input.

2. The system of claim 1, wherein initiating the presentation of the tethered smart device activity interface of the tethered smart device technology application further comprises:
  determining that a geographical location of the tethered smart device is the same as a geographical location of the user mobile device such that the tethered smart device is located within a predetermined near field communication range of the user mobile device;
  transmitting a trigger activation signal to the user mobile device, wherein the trigger activation signal is structured to cause an offline tethered smart device to connect to the communication network, wherein the trigger activation signal is configured to cause the user mobile device to:
    establish a near field operative communication channel, via the communication network, with the tethered smart device;
    transmit, via the near field communication channel, the trigger activation signal to the tethered smart device, wherein the trigger activation signal is configured to cause the offline tethered smart device to connect to the communication network; and
    transmit, via the near field communication channel, an interface control signal structured to cause the tethered smart device to present the tethered smart device activity interface of the tethered smart device technology application on the display device of the tethered smart device.

3. The system of claim 1, wherein initiating presentation of the tethered smart device activity interface of the tethered smart device technology application further comprises:
  determining that a geographical location of the tethered smart device is the same as a geographical location of the user mobile device; and
  transmitting an interface control signal to cause the tethered smart device to overlay the tethered smart device activity interface of the tethered smart device technology application on an existing display device interface of the tethered smart device, wherein overlaying the tethered smart device activity interface comprises disabling the existing display device interface such that only the tethered smart device activity interface is active;
  wherein the user mobile device is configured as a remote control for allowing the user to perform the first technology activity using the tethered smart device technology application, via the user mobile device.

4. The system of claim 1, wherein initiating the presentation of the tethered smart device activity interface of the tethered smart device technology application further comprises:
  identifying application parameters of the tethered smart device, wherein the application parameters of the tethered smart device comprise operating system parameters and display device parameters of the tethered smart device;
  configuring the tethered smart device technology application such that at least the tethered smart device activity interface of the tethered smart device technology application matches the application parameters of the tethered smart device, comprising:
    configuring the tethered smart device activity interface such that an application resolution of the tethered smart device activity interface matches a resolution of the display device parameters of the tethered smart device; and
    modifying display sizes and display positions of the one or more graphical elements such that tethered smart device activity interface is presented on the display device of the tethered smart device without requiring scrolling, wherein modifying display sizes of the one or more graphical elements comprises converting predetermined textual content of the one or more graphical elements into a pop-up interface and inserting a link element to the pop-up interface in the tethered smart device activity interface.

5. The system of claim 1, wherein the tethered smart device is a smart television device that is functionally tethered to an external power source comprising an energized electrical circuit.

6. The system of claim 1, wherein the tethered smart device is a smart speaker device having the display device, wherein the smart speaker device is functionally tethered to an external power source comprising an energized electrical circuit.

7. The system of claim 1, wherein initiating the presentation of the tethered smart device activity interface of the tethered smart device technology application further comprises further comprises:
  accessing a user mobile device security identifier stored in the user mobile device;
  accessing a tethered smart device security identifier stored in the tethered smart device;
  validating user authentication credentials received at the user mobile device from the user;
  authenticating the first technology activity, based on at least successful validation of (i) the user authentication credentials, (ii) the user mobile device security identifier, and (iii) the tethered smart device security identifier;
  allowing the user to perform the first technology activity using the tethered smart device technology application, via the user mobile device in response to successful authentication of the first technology activity.

8. The system of claim 1, wherein the predetermined graphical element of the one or more graphical elements associated with the first technology activity comprises at least one of (i) an input type component structured to facilitate receiving an user input associated with the first technology activity upon activation, and (ii) a security type component structured to output predetermined secure information associated with the first technology activity to the user.

9. The system of claim 1, wherein identifying the first technology interface portion of the tethered smart device activity interface that is associated with performing the first technology activity comprises determining, in real time, that the first technology interface portion comprises at least a portion of graphical elements required for performing at least a subsequent step of the first technology activity.

10. The system of claim 1, wherein identifying the first technology interface portion of the tethered smart device activity interface that is associated with performing the first technology activity comprises:
  tracking, via an optical sensor device of the tethered smart device, an area of gaze of the user's eyes when the user is viewing the tethered smart device activity interface presented on the display device of the tethered smart device, wherein tracking the area of gaze further comprises:

transmitting a sensing trigger signal that is structured to cause the optical sensor device to transmit a light signal comprising infrared and/or near-infrared light; and transmitting a recipient trigger signal that is structured to cause the optical sensor device to receive the reflected light signal reflected from the user's eyes;

determining the area of gaze of the user's eyes based on analyzing the reflected light signal, wherein computing the area of gaze comprises computing, continuously and in real-time, a point of regard of the user's gaze on the surface of the display device of the tethered smart device based on at least determining a gaze direction of the user's eyes;

identifying the first technology interface portion of the tethered smart device activity interface based on determining that (i) the first technology interface portion matches the area of gaze of the user's eyes, and (ii) the user viewed the area of gaze for at least a predetermined viewing time period.

11. The system of claim 1, wherein identifying the first technology interface portion of the tethered smart device activity interface that is associated with performing the first technology activity comprises:

determining, via an optical sensor device of the tethered smart device, a predetermined gesture performed by the user; and identifying the first technology interface portion of the tethered smart device activity interface based on correlating a three-dimensional special movement of the predetermined gesture performed by the user with a corresponding area of the display device of the tethered smart device.

12. The system of claim 1, wherein initiating the presentation of the tethered smart device activity interface of the tethered smart device technology application further comprises:

establishing, via the communication network, a wireless communication channel between the tethered smart device and an entity system associated with a specialist associated with performing the first technology activity;

establishing an audio-video conference, via a conference application of the tethered smart device, between the user and the specialist, wherein establishing the audio-video conference further comprises presenting a real-time video feed received from the entity system via the tethered smart device activity interface on the display device of the tethered smart device.

13. The system of claim 12, wherein establishing the audio-video conference further comprises:

activating a microphone device of the user mobile device for use with the presented auxiliary mobile interface on a display of the user mobile device;

receiving the user input comprising an audio input at the auxiliary mobile interface via the microphone device of the user mobile device; and transmitting, the received audio input to the entity system for conducting the audio-video conference between the user and the specialist.

14. The system of claim 12, wherein establishing the audio-video conference further comprises:

activating a speaker device of the user mobile device for use with the presented auxiliary mobile interface on the display of the user mobile device;

receiving an audio signal from the entity system comprising a real-time audio feed of the specialist; and presenting the received audio signal at the auxiliary mobile interface via the speaker device of the user mobile device for conducting the audio-video conference between the user and the specialist.

15. The system of claim 1, wherein determining that the spatial distance between the tethered smart device and the user is greater than the first predetermined distance is based on at least one of (i) determining, via received location signals from a positioning device of the user mobile device, that the spatial distance between the tethered smart device and the user is greater than the first predetermined distance, and (ii) identifying, via an image capture device of the tethered smart device, that the spatial distance between the tethered smart device and the user is greater than the first predetermined distance.

16. The system of claim 1, wherein the user mobile device is a smart phone device.

17. A computer program product for technology application restructuring and deployment for home receiver integration, wherein the computer program product is structured to provide a technology application on a functionally tethered smart device to facilitate performing user activities, comprising a non-transitory computer-readable storage medium having computer-executable instructions that when executed by a processing device are configured to cause the processing device to:

receive, via a first operative communication channel of the communication network, a trigger signal from a user mobile device associated with a user, wherein the trigger signal comprises activity data associated with a first technology activity initiated by the user;

establish a second operative communication channel, via the communication network, with a tethered smart device associated with the user;

transmit, via the second operative communication channel, a tethered smart device technology application to the tethered smart device;

initiate presentation of a tethered smart device activity interface of the tethered smart device technology application on a display device of the tethered smart device;

identify a first technology interface portion of the tethered smart device activity interface that is associated with performing the first technology activity, wherein the first technology interface portion comprises one or more graphical elements associated with the first technology activity;

in response to at least determining that (i) a spatial distance between the tethered smart device and the user is greater than a first predetermined distance and (ii) the first technology interface portion comprises a predetermined graphical element of the one or more graphical elements associated with the first technology activity, present an auxiliary mobile interface on a display of the user mobile device, wherein the auxiliary mobile interface comprises the predetermined graphical element of the first technology interface portion;

receive, via the auxiliary mobile interface of the user mobile device, a user input associated with the first technology activity;

modify, dynamically, the tethered smart device activity interface presented on the display device of the tethered smart device based on the user input received via the auxiliary mobile interface of the user mobile device, wherein modifying the tethered smart device activity interface comprises modifying the one or more graphical elements;

initiate presentation of an activity completion confirmation via the tethered smart device activity interface of the tethered smart device technology application in response to completion of the user activity based on the user input.

18. The computer program product of claim 17, wherein initiating the presentation of the tethered smart device activity interface of the tethered smart device technology application further comprises:
  determining that a geographical location of the tethered smart device is the same as a geographical location of the user mobile device such that the tethered smart device is located within a predetermined near field communication range of the user mobile device;
  transmitting a trigger activation signal to the user mobile device, wherein the trigger activation signal is structured to cause an offline tethered smart device to connect to the communication network, wherein the trigger activation signal is configured to cause the user mobile device to:
    establish a near field operative communication channel, via the communication network, with the tethered smart device;
    transmit, via the near field communication channel, the trigger activation signal to the tethered smart device, wherein the trigger activation signal is configured to cause the offline tethered smart device to connect to the communication network; and
    transmit, via the near field communication channel, an interface control signal structured to cause the tethered smart device to present the tethered smart device activity interface of the tethered smart device technology application on the display device of the tethered smart device.

19. A computerized method for technology application restructuring and deployment for home receiver integration, wherein the computerized method is configured to provide a technology application on a functionally tethered smart device to facilitate performing user activities, the computerized method comprising:
  receiving, via a first operative communication channel of the communication network, a trigger signal from a user mobile device associated with a user, wherein the trigger signal comprises activity data associated with a first technology activity initiated by the user;
  establishing a second operative communication channel, via the communication network, with a tethered smart device associated with the user;
  transmitting, via the second operative communication channel, a tethered smart device technology application to the tethered smart device;
  initiating presentation of a tethered smart device activity interface of the tethered smart device technology application on a display device of the tethered smart device;
  identifying a first technology interface portion of the tethered smart device activity interface that is associated with performing the first technology activity, wherein the first technology interface portion comprises one or more graphical elements associated with the first technology activity;
  in response to at least determining that (i) a spatial distance between the tethered smart device and the user is greater than a first predetermined distance and (ii) the first technology interface portion comprises a predetermined graphical element of the one or more graphical elements associated with the first technology activity, presenting an auxiliary mobile interface on a display of the user mobile device, wherein the auxiliary mobile interface comprises the predetermined graphical element of the first technology interface portion;
  receiving, via the auxiliary mobile interface of the user mobile device, a user input associated with the first technology activity;
  modifying, dynamically, the tethered smart device activity interface presented on the display device of the tethered smart device based on the user input received via the auxiliary mobile interface of the user mobile device, wherein modifying the tethered smart device activity interface comprises modifying the one or more graphical elements;
  initiating presentation of an activity completion confirmation via the tethered smart device activity interface of the tethered smart device technology application in response to completion of the user activity based on the user input.

20. The computerized method of claim 19, wherein initiating the presentation of the tethered smart device activity interface of the tethered smart device technology application further comprises:
  determining that a geographical location of the tethered smart device is the same as a geographical location of the user mobile device such that the tethered smart device is located within a predetermined near field communication range of the user mobile device;
  transmitting a trigger activation signal to the user mobile device, wherein the trigger activation signal is structured to cause an offline tethered smart device to connect to the communication network, wherein the trigger activation signal is configured to cause the user mobile device to:
    establish a near field operative communication channel, via the communication network, with the tethered smart device;
    transmit, via the near field communication channel, the trigger activation signal to the tethered smart device, wherein the trigger activation signal is configured to cause the offline tethered smart device to connect to the communication network; and
    transmit, via the near field communication channel, an interface control signal structured to cause the tethered smart device to present the tethered smart device activity interface of the tethered smart device technology application on the display device of the tethered smart device.

* * * * *